(12) United States Patent
Bapst et al.

(10) Patent No.: US 10,988,837 B2
(45) Date of Patent: Apr. 27, 2021

(54) METHOD FOR PRODUCING AT LEAST ONE COMPONENT FOR A HYDRAULIC DISPLACEMENT UNIT

(71) Applicant: Liebherr Machines Bulle SA, Bulle (CH)

(72) Inventors: Jose Bapst, Pont-la-Ville (CH); Carsten Kollmeyer, Le Paquier (CH); Erwin Feusi, Schmitten (CH); Gabriel Meckl, Riaz (CH)

(73) Assignee: Liebherr Machines Bulle SA, Bulle (CH)

( * ) Notice: Subject to any disclaimer, the term of this patent is extended or adjusted under 35 U.S.C. 154(b) by 238 days.

(21) Appl. No.: 16/107,940

(22) Filed: Aug. 21, 2018

(65) Prior Publication Data

US 2019/0062893 A1 Feb. 28, 2019

(30) Foreign Application Priority Data

Aug. 21, 2017 (CH) .................................... 1043/17

(51) Int. Cl.
| | |
|---|---|
| *C23C 8/80* | (2006.01) |
| *B23P 25/00* | (2006.01) |
| *C21D 1/04* | (2006.01) |
| *C23C 8/24* | (2006.01) |
| *C23C 8/36* | (2006.01) |
| *C21D 1/10* | (2006.01) |
| *C23C 8/30* | (2006.01) |
| *B23P 15/10* | (2006.01) |

(52) U.S. Cl.
CPC ................ *C23C 8/80* (2013.01); *B23P 25/00* (2013.01); *B23P 25/003* (2013.01); *C21D 1/04* (2013.01); *C21D 1/10* (2013.01); *C23C 8/24* (2013.01); *C23C 8/30* (2013.01); *C23C 8/36* (2013.01); *B23P 15/10* (2013.01); *B23P 2700/11* (2013.01)

(58) Field of Classification Search
CPC ..... C23C 8/80; C23C 8/24; C23C 8/30; B23P 25/003; C21D 1/04; C21D 1/10; B23C 8/80; B32P 2700/11; B32P 25/003
See application file for complete search history.

(56) References Cited

U.S. PATENT DOCUMENTS

2008/0166579 A1\* 7/2008 Kotthoff ................... B22F 7/06
428/547

\* cited by examiner

*Primary Examiner* — Jessee R Roe
(74) *Attorney, Agent, or Firm* — McCoy Russell LLP

(57) ABSTRACT

The present application relates to a method for producing at least one component for a hydraulic displacement unit, wherein the method is characterized by the steps: prefabrication of a blank component for the at least one component, wherein at least one defined surface region of the blank component is fabricated intentionally with oversize, surface-hardening of the blank component, and final forming of the component from the hardened blank component by removal of the excessive material at the at least one defined surface region fabricated with oversize.

18 Claims, 20 Drawing Sheets

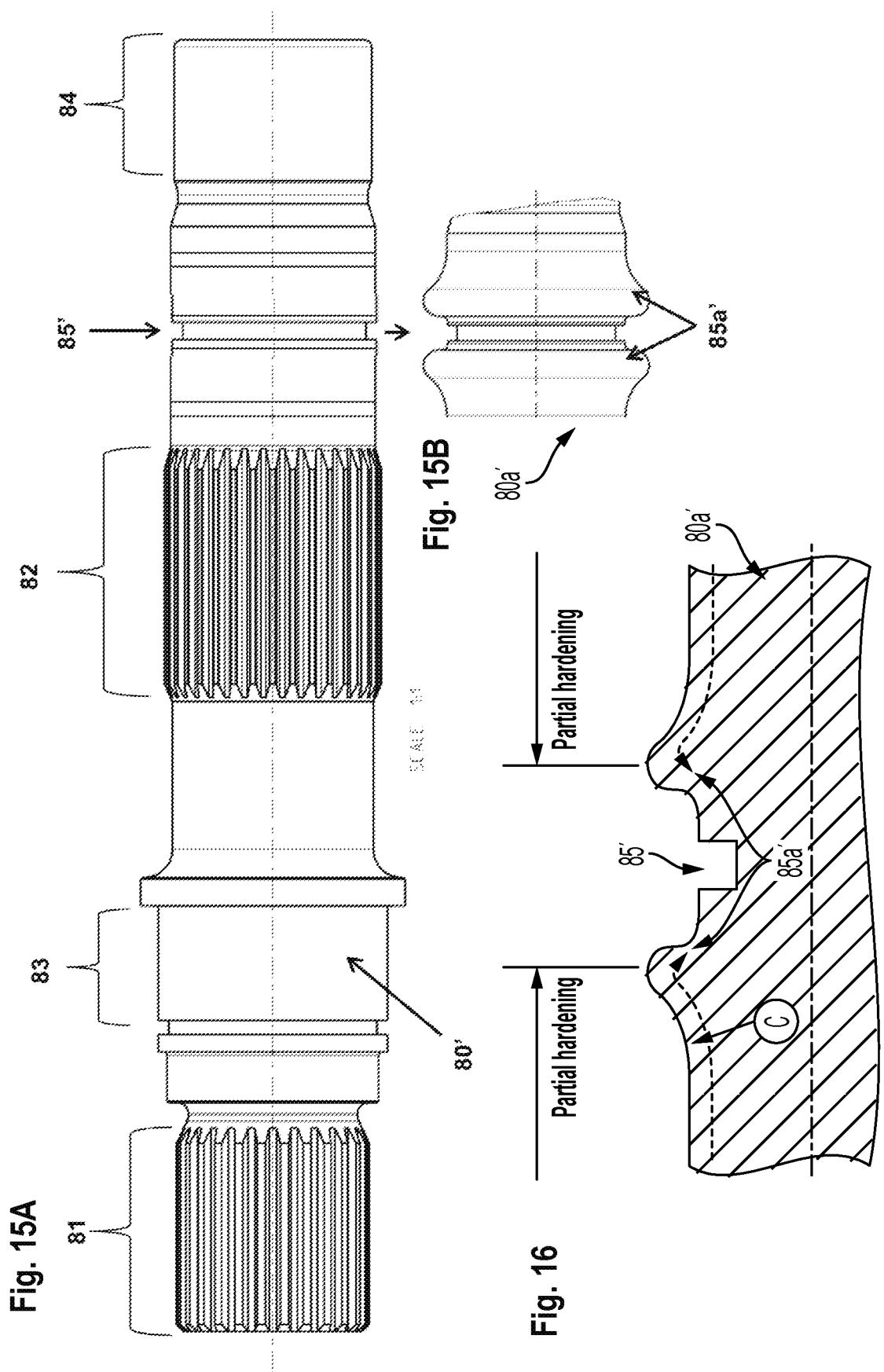

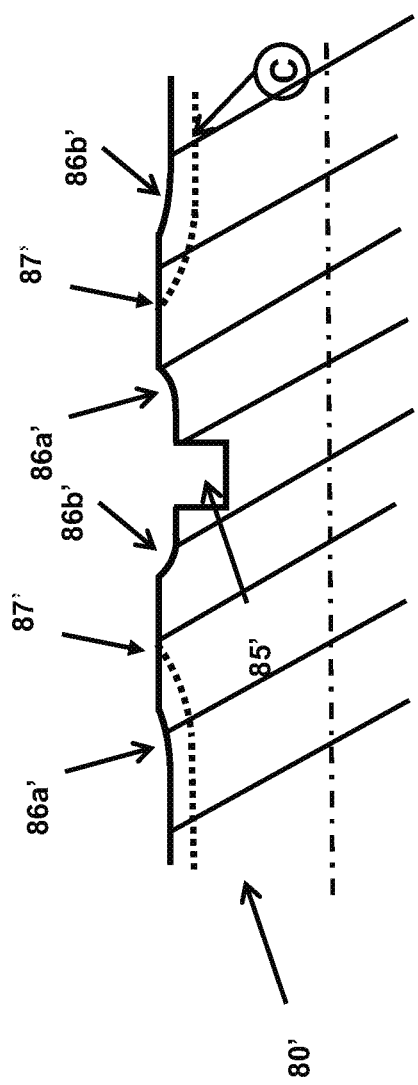
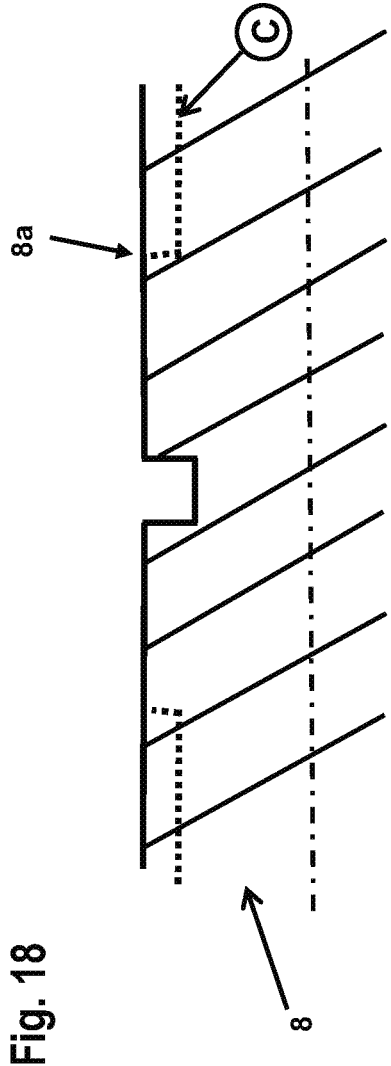

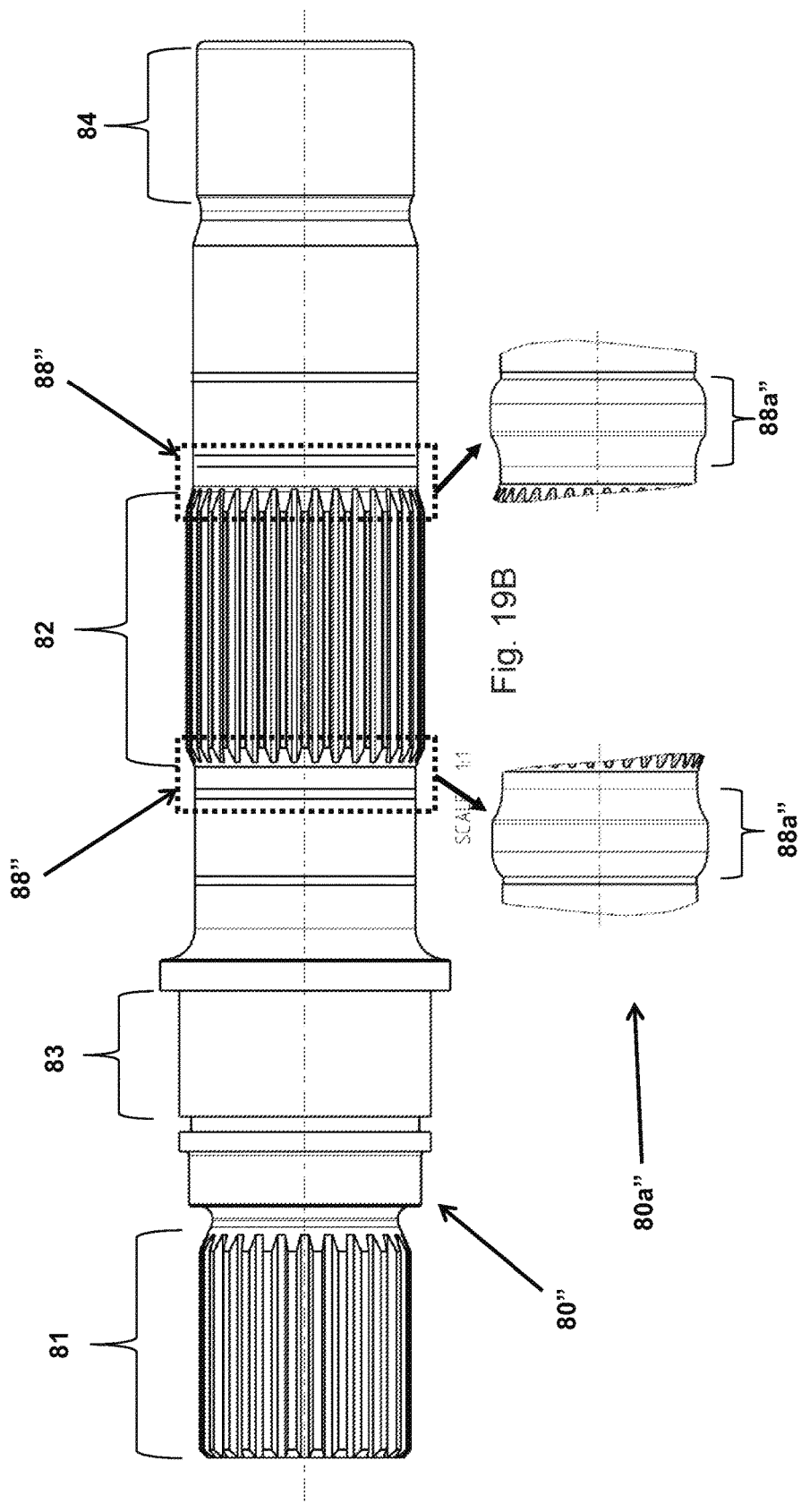

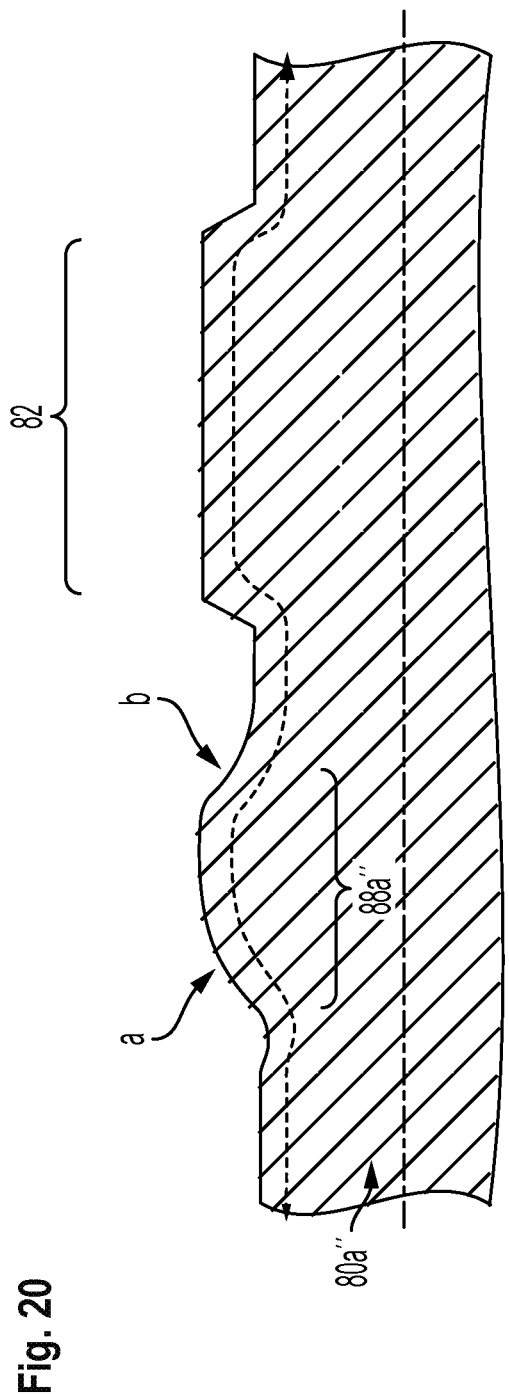
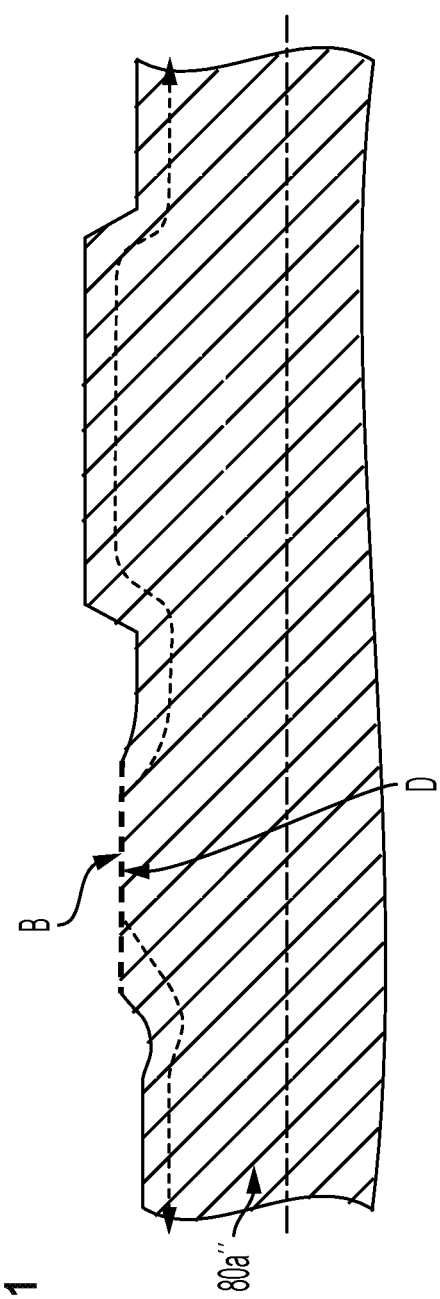

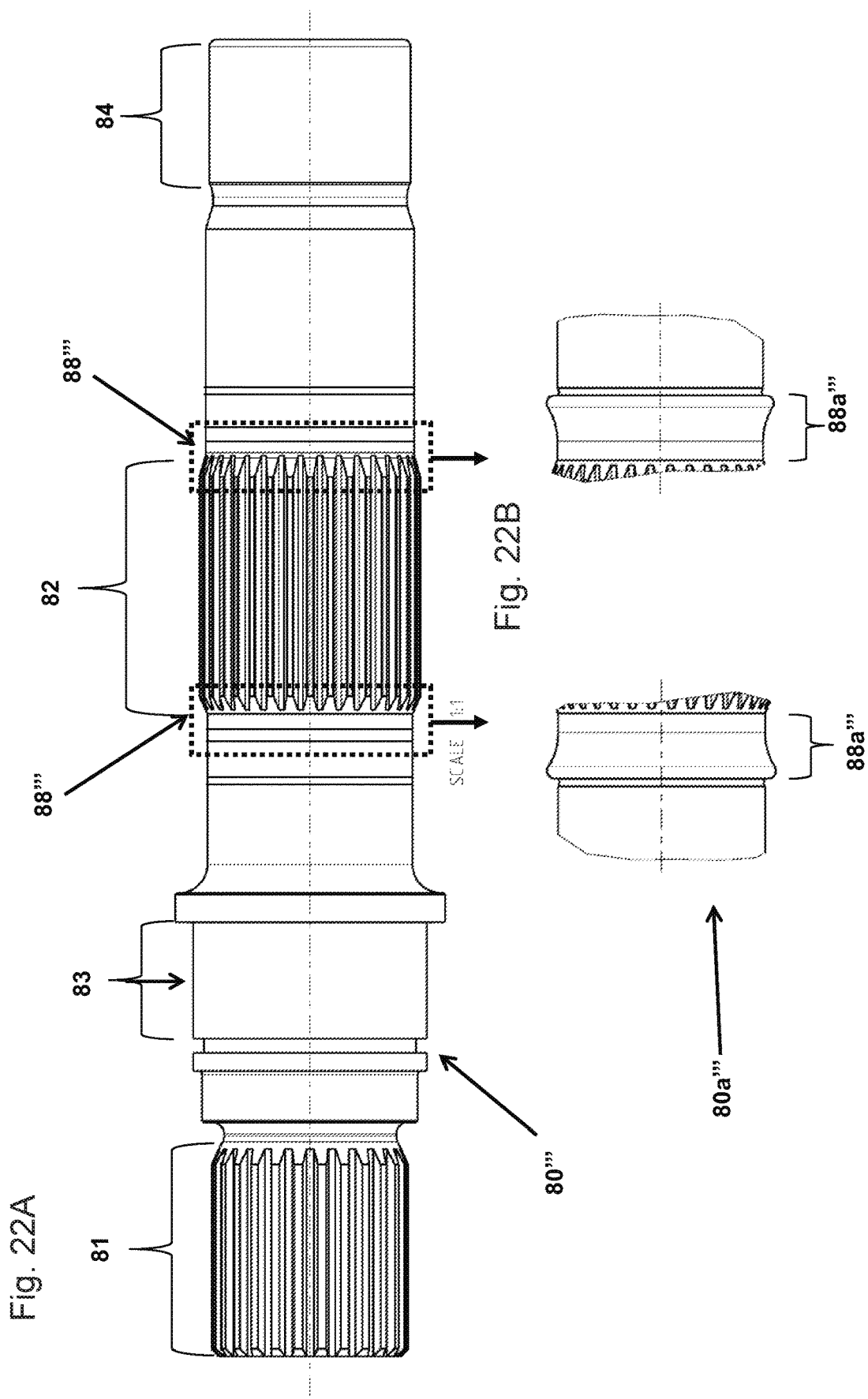

METHOD FOR PRODUCING AT LEAST ONE COMPONENT FOR A HYDRAULIC DISPLACEMENT UNIT

CROSS REFERENCE TO RELATED APPLICATION

This application claims priority to Swiss Patent Application No. 01043/17 entitled "METHOD FOR PRODUCING AT LEAST ONE COMPONENT FOR A HYDRAULIC DISPLACEMENT UNIT," filed Aug. 21, 2017, the entire contents of which is hereby incorporated by reference in its entirety for all purposes.

TECHNICAL FIELD

The application relates to a method for producing at least one component for a hydraulic displacement unit.

BACKGROUND AND SUMMARY

Certain components for hydraulic displacement units, such as axial piston machines, are hardened after production of the final shape in order to be able to meet the high demands in regards to material strength and durability. Known are methods for the overall hardening of a component as well as for the partial hardening of merely specific surface portions of the component. Depending on the profile shape of the components, such as in the region of concave portions, abrupt changes of the obtained degree of hardness can occur in the material structure. Such abrupt transitions pose a weakness of the material in any case, and in view of the bending and torsion forces acting on the component.

One example for such a component is the drive shaft of a hydraulic displacement unit, such as the drive shaft of an axial piston machine. The said drive shaft is subject to high stress due to high absolute values and high time gradients of the torsional moment, to a longitudinal bending, as well as to tensile stress and pressure loads in the longitudinal direction. An increased risk for rupture exists, e.g. in notches present in the components, such as in those transitions of the component where the hardness of the material changes abruptly. It is therefore desirable to prevent such abrupt changes of the material hardness.

Surface hardening is also problematic in those components that have to be formed in the assembly of the displacement unit, e.g. in order to be joined or connected to complementary components, such as is the case in a ball joint connection. In this case, microcracks can occur in the surface structure in the hardened surface already in the joining process. One example for this may be presented by an axial piston machine, in which the pistons are provided with sliding blocks for hydrostatic relief of engines and actuators. The connection between the piston and its sliding block occurs through a ball joint connection.

Piston/sliding block units, in which the ball head is connected to the sliding block in an integral manner and in which the ball sits on the piston, require a higher production effort, but also allow higher oblique angles (also referred to as setting angles) of the sliding block surface. Operation of piston engines with higher oblique angles leads to better effects and to an increase of their power density. The piston/sliding-block units used in engines of piston machines are subjected to stress alternately due to high pressure and tensile forces acting in axial and vertical directions. Without limitation, the causes therefore are as follows:

In operation of the engine, the piston/sliding-block unit is applied with the oil pressure at the high-pressure side.

In operation of the pump, pressure is applied to the oil by the pistons at the high-pressure side, whereas at the low-pressure side, the pistons generate the negative pressure required for suctioning the oil and are therefore subject to a tensile force.

Irrespective of whether a piston machine is operated as a pump or as an engine, friction forces occur between the side wall of the piston and the engine bushing; likewise between the sliding block surface and the support surface thereof.

The resulting axial and radial forces exert stress on a piston/sliding-block unit and therefore also on the ball joint connection not only with absolute values, but also by fast changes in these forces, so-called transients. The latter are, amongst other things, created by pressure pulses in the hydraulic oil circuit, which are not completely prevented; likewise in the case of a pump operation by transient changes of the supplied mechanical power, and in the case of engine operation by transient changes of the mechanical load.

As is the case in rotary machines, also in piston engines increased performance can be achieved in a more cost-effective manner by means of specific measures which allow for operation with increased rotating speed, in contrast to the designing of the machine from the very beginning for an operating range that allows higher torques. However, an increase in rotating speed results in an increase of the centrifugal forces originating from the piston/sliding-block units, which on the one hand apply the piston and the cylinder directly-mechanically or indirectly mechanically-thermally due to the increase of the frictional force as well as effect a higher mechanical stress of the piston retraction direction and also of the ball joint connections of the piston/sliding-block units.

A measure for increasing the allowable speed range of axial piston machines effective in multiple regards lies with the weight reduction of the pistons used in the engine, which can compensate the centrifugal forces originating therefrom and therefore also the negative consequences mentioned-above. For a long time, the pistons used in engines are formed in lightweight design as hollow pistons, wherein the hollow space is sealed in an oil-tight manner. Despite the fact that the weight reduction of the pistons by the creation of larger voids causes a reduction in the forces applied to the pistons, there is a trade-off between the lightweight construction and the durability of the pistons. FIG. 1 shows an example for a piston 1 provided with a hollow space in a piston/sliding-block unit, with the sliding block denoted with reference character 2. When making the ball joint connection, the protruding collar 1a of the recess for receiving the ball head 2a is deformed accordingly, whereby an inner surface is created in the forming region, which surface constitutes an exactly-shaped extension of the spherical cap 1b for enclosing the ball head 2a. Illustrated here is a suitable tool for forming the collar 1a. It goes without saying that the ball head 2a and the spherical cap 1b have smooth surfaces to avoid wear to a largest possible extent. Furthermore, the ball head 2a and the wall of the cap 1b have a certain strength in order that the surfaces in the connection region of the ball joint connection possibly do not change at all during the use, and to prevent a rupture of the connection.

The forming region of the protruding collar 1a of the recess for enclosing the ball head 2a constitutes a weakness region of a ball joint connection. Owing to forces acting between the ball head 2a and the cap 1b, there is a risk for material rupture damage in the forming region. Owing to pressure forces between the ball head 2a and the spherical cap 1b, the surface region can collapse, according to the principle of the so-called "eggshell effect." Besides such obvious defects, microcracks can occur already in production when inserting the ball head 2a. A break-loose of the material or of parts of the material upon insertion and over the period of use leads to a slow but progressive damage, even in smaller amounts, which then causes a fast ageing of the joint connection. Instead of a rupture or abrasion of the material, a slowly-progressive widening of the forming region can occur. In view of the long period of use of piston engines used in commercial applications, e.g. in the construction form of an axial piston engine functioning as an hydraulic pump or as an hydraulic engine, in a mobile working machine, also slowly-occurring damages might be prevented in ball joint connections of their piston/sliding block units by means of a corresponding quality of the components, because these damages continue in a progressive manner and may lead to an early destruction of the concerned piston/sliding block unit, or to an early failure of the mobile working machine.

It is therefore the object of the present application to provide a production method for components of a hydraulic displacement unit, which reacts to the above-mentioned drawbacks. A focus of the application also lies with the provision of a corresponding ball joint connection or a suitable production method for a ball joint connection, by means of which the above described disadvantages of existing solutions of the conventional art can be overcome.

The subject-matter of the application is a method for producing a component for a hydraulic displacement unit, such as an axial piston machine. The objective of the method lies with achieving a specific hardness profile at the surface of the component, which can in any case be exactly optimized by the method individually dependent upon the type of component and use.

According to the application, it is provided to that end that a blank component for the at least one component is prefabricated intentionally with oversize on at least one defined surface region. For example, a blank of the component is to be produced from a blank body by means of a machining method such as drilling or turning. However, defined surface regions of the components are intentionally prefabricated with oversize, while the remaining sub-regions of the components may already produced in their final size. The component is subsequently surface-hardened.

The final forming of the component follows the hardening process. At least the excessive material is removed at the at least one defined surface region of the component that had been produced with oversize. The material removal can be effected by means of a machining method. By the subsequent material removal, the previously achieved surface hardness can be reduced in a targeted manner again. This achieves a component which is characterized by subregions of its surface with different degrees of hardness. One feature of the method according to the application lies with the fact that surface regions directly adjacent to one another can be produced to have different material hardness by means of this method.

Consequently, the finished component can be provided with different, clearly-defined and thus optimized material hardness depending on the area. A continuous transition from strongly-hardened to less strongly hardened or completely unhardened component surface regions can ideally be achieved by means of the controlled removal of the oversize along the component surface.

A use of the method is reasonable in those components of the displacement unit that need to be formed in certain subregions for the mounting of the displacement machine, for example in order to produce a connection to corresponding counterparts. In components that are joined with mating parts by cold-forming, the surface hardness in the forming region can be optimized by means of the method, in order to avoid the disadvantages described with regard to the conventional art.

Another aspect of the application proposes a method for producing a ball joint connection consisting of a first joint part with a ball head and a second joint part with a complementary ball head receptacle. Even though reference was initially made to such a connection between a piston and a sliding block of an axial piston machine, this aspect of the application is not at all limited to such an application, because the solution according to the application can be used for any ball joint connections concerned by the drawbacks mentioned at the beginning.

According to this configuration and application of the method, it is proposed to produce a first and/or second blank joint part of the ball joint connection in a prefabrication step. A blank of the first and/or second joint part is to be produced from a blank body by means of a machining method such as drilling or turning, for example. However, defined surface regions of the first and/or second blank joint part are intentionally prefabricated with oversize, while the remaining subregions of the respective blank joint part are might be produced with their final size already.

The first and/or second blank joint part is subsequently surface-hardened.

After the hardening process, the final forming of first and/or second joint part is effected. At least the excessive material is removed from the at least one defined surface region of the first and/or second blank joint part that has been produced with oversize. The material removal can occur by means of a machining method. The previously achieved surface hardening can be reduced again by the subsequent material removal, in a controlled manner. This achieves a first and/or second joint part, which is characterized by subregions of its surface with different hardness degree. A feature of the method according to the application lies with the fact that surface regions directly adjacent to one another can be produced to have a different material hardness by means of this procedure.

In the final step, the joint parts are joined and at least one joint part is correspondingly formed for establishing the ball-joint connection. By the use of the method according to the application, a region to be formed of the joint part is distinguished by a reduced surface hardness while producing a ball-joint connection. The resulting sufficient ductility of the material in this region is a prerequisite for a plastic formability, free of cracks, of the material, whereby also a cold-forming, e.g. by rolling-in, rolling or bending of the joint part becomes possible without material deterioration. The remaining subregions of the joint part, at least those subregions that are stressed by the axial and radial forces occurring in operation, have a sufficient surface hardness by the hardening process. Where required or appropriate, the hardened surfaces can be smoothened in an intense manner by suitable processes and measures in order to reduce friction and wear.

The ball head receptacle of the second blank joint part might have a calotte shape after prefabrication, adjoined by a protruding collar. This producing collar is to be formable in such a way, after the joining of the joint parts by forming, that it at least partially engages behind the received ball head. As a result, the forming of the protruding collar is to complete the calotte shape for receiving the ball head, so that a sufficient stability of the joint connection can be achieved. It can thus be reasonable when at least a subregion of the protruding collar is prefabricated with oversize, so that after the hardening process, the material hardening initially achieved on the existing surface can be reduced by means of a corresponding material removal, whereby even in the case of cold-forming, a plastic deformability of the collar which is free of cracks for the subsequent forming process by a sufficiently high ductility of the said collar.

In an configuration of the method, the prefabrication of the blank joint part with oversize occurs in such a way that the surface of the collar, which engages behind and contacts the ball head after the cold-forming process, includes a subsection with a surface hardness which is higher than that of the remaining section of the surface contacting the ball head after the cold-forming. On the one hand, the joining region of the workpiece (collar), where the cold-forming takes place directly, is to have a relatively low hardness. On the other hand, after inserting the ball head into the ball head receptacle and cold-forming of the collar, a contact surface of the said subregion exists toward the ball head. By providing a suitably selected allowance in the designing of the shape of the blank joint part, a part of the hardened zone can be removed after material removal which occurs after the hardening process and, as a result, a hardened layer of a desired thickness htf can be maintained. The sub-portion might not extend all the way to the end of the collar facing the first joint part, but it is not excluded.

A first and/or second joint part is/are made of a material having high ductility shows advantages. However, a sufficient surface hardness is to be achievable for this material by means of a suitable hardening process. The hardening process is usually effected by means of a heat treatment. Suitable methods are, for example, nitration, gas nitration, gas nitro carbonation, or plasma nitration.

According to a configuration of the application, the ball head receptacle of the second blank joint part, i.e. the surface or wall of the blank joint part forming the recess/receptacle, is prefabricated with a bulge-like oversize, such as with an annular bulge, which extends along the surface of the second joint part forming the calotte shape.

After the hardening process, the material forming the bulge at the collar can be removed along with the finishing, so that the material hardness is reduced at the collar along this longitudinal section. According to a configuration, the material removal can progress along the bulge so far that it is not only fully removed, but finally an annular groove develops in the surface that forms the ball receptacle. As a result, due to the relatively high material removal, a groove is produced, the surface of which has a strongly reduced material hardness. Such as, an annular internal groove is produced in the surface of the second joint part forming the ball calotte. The purpose of this design lies with the prevention that the forces to be applied by the tools are introduced into the wall region that is already form-fittingly adapted to the ball head or no forming at all is caused in this region. The latter would logically lead to a potential jamming of the ball head connection. The mere introduction of forces into this hardened and thus brittle region could trigger small amounts of material or material fractions to break-out.

According to a configuration of the application, the bulge-like oversize is configured with tangent-like transitions, i.e. the contour of the bulge does not have or has only few edges, and is thus distinguished by a substantially edgeless contour.

According to a further embodiment of the method, at least one joint part of the ball joint connection according to the application, such as the second joint part, is preformed to have a cylindrical or almost cylindrical shape. This can be the case in the fabrication of the piston-sliding block unit described at the beginning, wherein the second joint part corresponds to the piston of a piston machine here. Part of the external cylinder wall of the blank joint part forms a part of the protruding collar. The external cylinder wall is removed in sections in the region of the collar during the final forming, so that a surface with reduced hardness for the subsequent cold-forming is produced here. In contrast, the remaining external cylinder wall is distinguished by maximum surface hardness achievable in the hardening process.

In addition, it is also conceivable that the external cylinder wall is fabricated with a larger diameter in the region of the collar to further reduce the surface hardness by larger material removal.

Besides the method according to the application, the present application also relates to a ball joint connection consisting of two joint parts, with a first joint part, which comprises a ball head, and a second joint part, which provides a ball head receptacle. According to the application, the ball joint connection is characterized in that the surface forming the ball head receptacle has regions of different surface hardness. Such as, the ball joint connection is characterized by neighboring surface regions with deviating material hardness.

According to a configuration of the application, the ball joint connection is produced by means of a method according to the present application or a configuration of the method according to the application. As a result, the ball joint connection is characterized by the same advantages and properties as have been described above based upon the method according to the application. For this reason, a repeated description is omitted.

According to a configuration of the ball joint connection, at least one groove, such as an annular groove, is provided in the calotte-shaped wall of the ball head receptacle, wherein this annular groove is characterized by a reduced surface hardness compared to the calotte-shaped wall.

Furthermore, a protruding collar adjoining the calotte shape can be provided, the surface hardness of which is at least sectionally reduced compared to the calotte-shaped wall.

Moreover, at least one joint part of the ball joint connection according to the application is formed in cylindrical shape, wherein its circumferential cylindrical surface predominantly is present with high surface hardness. Furthermore, it can be possible that a part of the external cylinder wall of the joint part forms a part of the protruding collar. In this case, the region of the external cylinder wall representing the collar is characterized by a reduced surface hardness. The external wall of the joint part usually has a reduced diameter in the collar region.

According to an configuration, the surface of the collar of the second joint part that engages behind and contacts the ball head can include a subsection with a surface hardness higher with respect to the remaining section of the surface engaging behind the ball head. On the one hand, the joining region of the joint part, in which the cold-forming directly occurs, is to have a (comparatively) low hardness. On the other hand, after inserting the ball head, a contact surface toward the ball head exists in the subregion concerned here. In order to take account for this point, there actually is hardened material in this subregion in a completed piston according to the application, but with a significantly lower hardness or a hardened layer with a significantly lower thickness hrt than in the regions of the high material hardness, e.g. the shell of the piston contacting the bushing of the engine. The subsection with the low material hardness can extend all the way to the end of the collar facing the first joint part, or might not reach as far as to the said end.

According to an configuration, this subregion might have a hardening depth htf in the range from 0.02 to 0.7 mm, or in the range from 0.02 mm to 0.25 mm. A surface hardness for this subregion in the range between 300 HV and 1000 HV is advantageous, further benefits might arise between 300 HV and 600 HV or 300 HV and 500 HV. The length ratio between the distance of the central axis of an annular internal groove and the end of the collar facing the first joint part, and the distance of the subregion from the end of the collar facing the first joint part is in the range between 0 and 40%, 0 and 35%, or 0 and 30%.

The application also relates to a sliding-block-piston unit with a ball joint connection. In an embodiment, the first joint part corresponds to the sliding block and the second joint part corresponds to the piston. Ideally, the sliding-block-piston unit is fabricated according to the method according to the application.

However, the method according to the application can not only be used for the production of components with forming region, but can also be used for the production of those components in which an increased strength can be achieved by a location-dependent adjustment of the material hardness. A specific example for that is the production of a drive shaft for a hydraulic displacement unit, such as for an axial piston machine.

A drive shaft is subject to high stress by high absolute values and high time gradients of the torsional moment, a longitudinal bending as well as tensile and pressure forces in the longitudinal direction. Such a drive shaft usually comprises one or multiple concave portions along its axis direction, e.g. in the form of a tapering-diameter recess for receiving a securing ring. With respect to the bending and the torsional moments, such concave sections are weak points of the shaft. A higher risk of rupture exists, inter alia, in notches existing in the component, and on those transitions of the component where the material hardness changes abruptly.

To that end, the blank of the drive shaft is formed with oversize, namely on the point of the drive shaft where such a concave portion is provided afterwards after completed final forming. After the surface hardening, the excessive material can be removed during the final forming at the at least one defined surface region of the drive shaft that has been produced with oversize, in order to obtain the desired concave portion. By the subsequent material removal, however, the previously achieved surface hardness is reduced in a controlled manner at the same time, so that ideally a continuous transition from strongly hardened to less strongly hardened and completely unhardened component surface regions is finally achieved. This prevents the weak points of the component, i.e. the drive shaft, caused by the notch effect, which result from direct transitions from strong-hardened to unhardened component regions. Furthermore, the gradient of the course of hardness starting from the component surface into the component interior can be set.

It is also conceivable that the at least one defined surface region intentionally produced with oversize is located in a place of the drive shaft which, in the final-formed state, is directly adjacent a concave and tapering-diameter region. The exact position of the surface region and the dimensioning of the oversize clearly depends on the desired final form of the drive shaft, the desired hardness degree as well as on the type of the hardening process performed.

For example, a convex material bulge is provided as an oversize of the blank in the defined surface region, the maximum of which bulge is located in the position where this drive shaft has its maximum depression/taper in the final-formed state. The blank might be globally hardened afterwards, potentially through nitration, gas nitration, gas nitro carbonation, or plasma nitration.

It is also conceivable to provide at least one convex material bulge, as an oversize of the blank, in the transition to a concave/tapering-diameter section of the drive shaft. The concave/tapering-diameter section usually exists in the blank already, merely the transition area from the non-tapered region to the tapered region is post-processed in the way of final forming. A partial hardening of the surface region lends itself for such a procedure, namely of a longitudinal section of the drive shaft, which reaches from the non-concave or non-tapering-diameter section all the way to the convex material bulge. A partial hardening is potentially made by means of induction hardening and/or laser beam hardening and/or electron beam hardening.

As has been described multiple times, a drive shaft is subject to high stress in the region of specific sections. For example, a high local stress occurs by the abutting of the drive shaft drum in an axial piston machine, which introduces the transversal forces into the drive shaft, which in turn result from the supporting of the pistons on the swashed plate. Furthermore, the by far largest portion of the torsional moment is produced along a drive shaft between the shaft input (i.e. the toothing of the drive shaft outside the housing) and the shaft toothing with which the drum is connected to the drive shaft in a form-fit and co-rotational manner. Due to this high stress of this longitudinal section, measures for preventing any notch stress is desirable.

The problem can be addressed by creating a longitudinal section of the drive shaft for stress handling. By an variant of the method according to the application, instead of a completely hardened drive shaft, a drive shaft with a specific hardness profile in the axial direction can be realized. The surface profile is adjusted in such a way here that material stress occurring in the component during regular operation of the displacement unit, such as of the axial piston machine, can be handled. Potentially, a higher stress resistance and durability of the drive shaft can be achieved if the drive shaft has a hardness profile advantageous in the axial direction within two longitudinal sections, which are located directly next to the toothing for the form-fit and co-rotational connection of a drive shaft drum, with a hardness degree $HV(x) \leq Max [HV(x)]$. The surface of the drive shaft has a material hardness of Max [HV(x)] outside these longitudinal sections.

To that end, a blank of the drive shaft is produced, for example, in which an oversize is provided in the regions of the drive shaft, which are directly adjacent or in direct proximity to the toothing of the drive shaft. By the final forming after surface hardening, the above mentioned hardness profile can be achieved there, in order to support the handling of stress.

The surface hardening of the engine shaft can be carried out by means of global surface hardening of the blank, e.g. by means of nitration, gas nitration, gas nitro carbonation or plasma nitration, or, instead, by a partial hardening of the one or multiple longitudinal sections including the toothing, e.g. by means of induction hardening and/or laser beam hardening and/or electron beam hardening.

Besides the method according to the application for fabricating the drive shaft, the application also discloses a drive shaft which exhibits a material hardness profile with varying hardness degree in the longitudinal direction, wherein the resulting hardness profile potentially does not have abrupt changes of the hardness degree, but instead a tangentially-constant course of the hardness degree in the axial direction.

Further advantages and properties of the application will hereinafter be explained in more detail by means of an exemplary embodiment illustrated in the drawings. The

BRIEF DESCRIPTION OF THE FIGURES

FIG. 15A shows a second version of a drive shaft produced according to the method according to the application.

FIG. 15B shows a detailed representation of the shaft blank for the drive shaft according to FIG. 15A.

FIG. 16 shows a schematic sectional illustration of the blank of FIG. 15B.

FIG. 17 shows a schematic sectional illustration of the final-formed drive shaft of FIG. 15A.

FIG. 18 shows a schematic sectional illustration of a conventionally fabricated drive shaft.

FIG. 19A shows a detailed representation of a drive shaft fabricated according to the method according to the application.

FIG. 19B shows a detailed representation of the shaft blank for the drive shaft of FIG. 19A.

FIG. 20 shows a schematic sectional illustration of the blank of FIG. 19B.

FIG. 21 shows a schematic sectional illustration of the final-fabricated drive shaft of FIG. 19A.

FIG. 22A shows a fourth version of a drive shaft fabricated in accordance with the method according to the application.

FIG. 22B shows a detailed representation of the shaft blank for the drive shaft of FIG. 22A.

DETAILED DESCRIPTION

Figure 12:
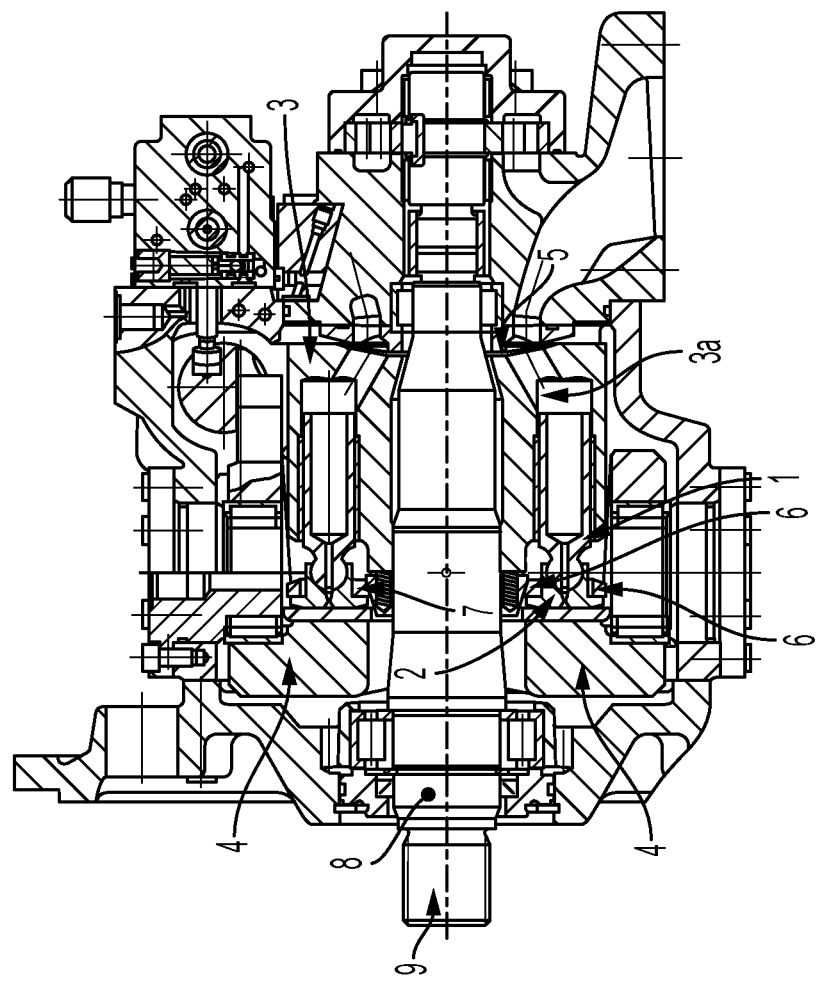
FIG. 12 shows a sectional illustration of an axial piston machine.

The methods according to the application as well as the ball joint connection according to the application is to be explained in the following by way of example based upon a drive shaft 8 as well as a sliding block piston unit 2, 1 for a piston machine. For this reason, first the general construction of such a machine is to be briefly described. A sectional representation of such an axial piston machine is shown in FIG. 12. The illustrated machine includes the typical components, such as an engine drum 3, which is connected to the drive shaft 8 in a form-fit and co-rotational manner. Multiple engine pistons 1 are accommodated in the engine cylinder bores 3a and comprise sliding blocks 2 mounted on the end side thereof, which are being pressed on to the swash plate 4. The control plate 5 is located to the right of the engine drum 3 in the sectional illustration, the hole pattern of which releases or interrupts the flow of oil into or out of the engine pistons 1.

A retention device of the axial piston machine comprises a retraction plate 6 and a retraction ball 7. This ball is mounted on the drive shaft 8 coaxially as well as co-rotationally and in a linearly displaceable manner. The retraction plate 6 acting on the sliding blocks 2 is in operational connection with the retraction ball 7, i.e. the retraction plate 6 is actuated by a linear displacement of the retraction ball 7, whereby the sliding surfaces of the sliding blocks 2 are each being pressed against the swashed plate 4 over the entire surface thereof. Via the external toothing, the drive shaft 8 can be connected to the external device for the transmission of torque.

A focus of the application relates to the production of the engine pistons 1 as well as the of the sliding blocks 2, such as the existing ball joint connection between the two components 1, 2. The object of the application lies with the creation of a one-piece component, e.g. a one-piece piston or one-piece piston basic body, which has various different material properties in closely neighboring zones. On the one hand, a hardened and smooth surface is to be available, on the other hand a sufficiently high ductility is to be available, so that the requirement of a plastic formability without cracks is met and thus a cold-forming, e.g. by rolling, rolling-in, bending, etc. of the component is possible without material deterioration.

The blank piston prepared for a heat treatment consists of a relatively soft basic material and is produced with specified production oversize. The blank piston is subjected to an intensive heat treatment, until its surface has a material hardness which is sufficient for the range of strongest stress. After the removal of the fabrication oversize, a piston that has the required geometry is achieved. Due to the previous intentional oversize, the piston surface has a different material hardness, which is adapted to the different requirements.

For a better understanding, first the features of the piston according to the application are explained, and after that, the production method will be explained, underlining the substeps according to the application:

A) Piston According to the Application

Figure 1:
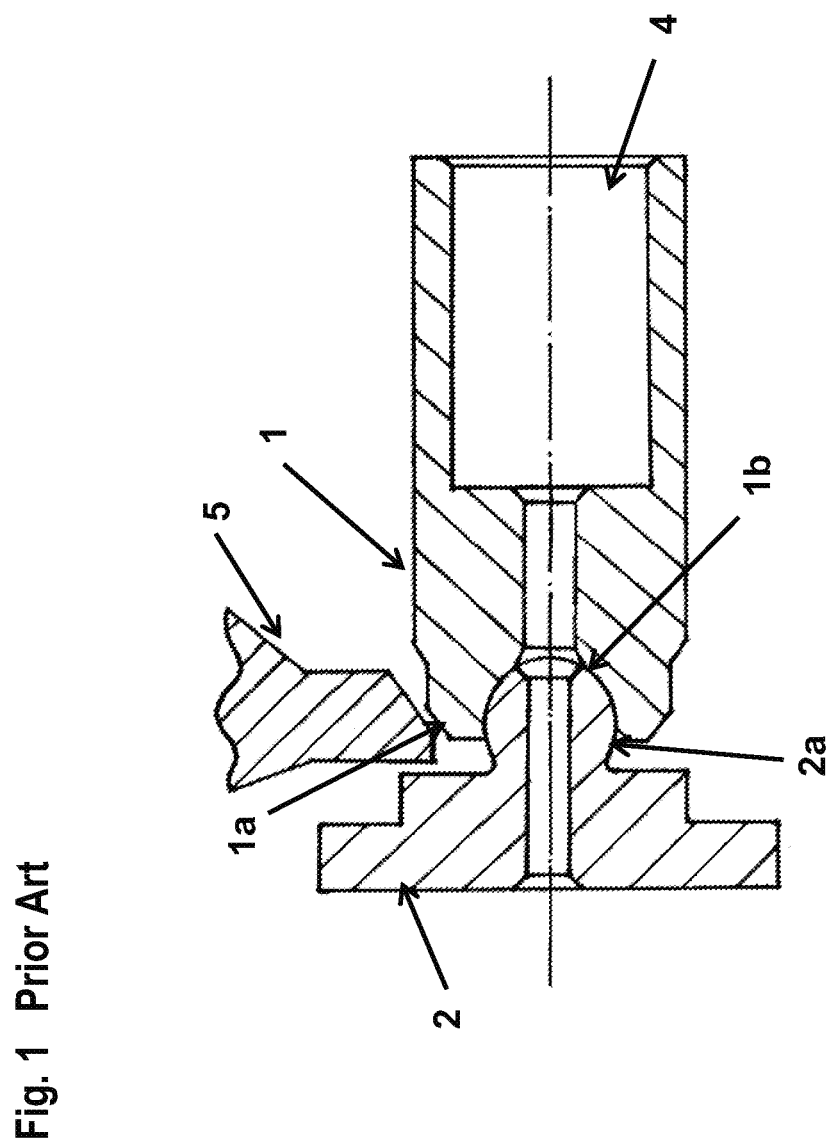
FIG. 1 shows a sliding-block piston unit according to the conventional art.
Figure 2:
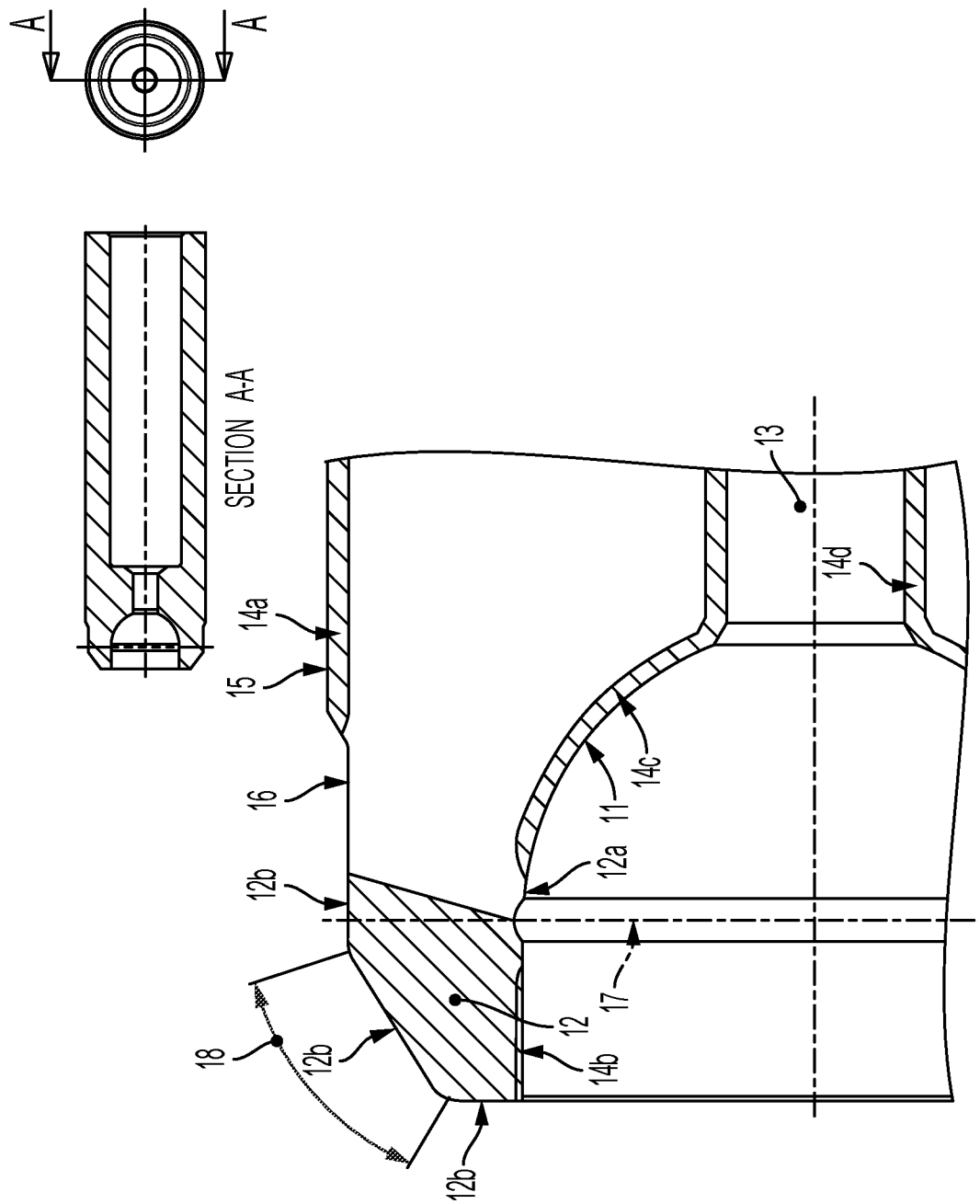
FIG. 2 shows a representation of the piston according to the application according to a first embodiment.

FIG. 2 shows the central longitudinal section and an enlarged sub-region of the piston 10 according to the application. In the lower part of the enlarged view, (i) a part of the recess is discernable, into which the ball head of the sliding block is inserted, consisting of a right-side internal chamber, which already has the calotte shape 11 adapted for the receiving of the ball head, and which is adjoined, to the left, by a protruding collar, and (ii) a part of the channel 13 for the oil supply required for lubrication and hydrostatic relief. The part of the enlarged view located above it shows the remaining solid material of the piston 10 as far as up to its external surface. The features according to the application of the completed piston 10 concern the presence of expedient, significantly different material hardnesses in sometimes closely neighboring regions of the piston surface.

The regions 14a, 14b, 14c, 14d indicated with the coarse hatches exhibit the layer hardened by heat treatment (e.g. nitration). The surfaces 14a, 14b, 14c, 14d facing inwards and outwards of these layers of the piston 10 have an extremely high material hardness, and clearly a smooth surface is to be present for the zones (i) and (ii) in the completed piston 10. These two properties are exhibited on the piston external wall 15 over the entire section that contacts the surface of the engine bore or the bushing installed there in the course of the axial piston movement. Furthermore, these properties are exhibited within the section of the surface 14c of the piston recess, which already has the form-fit ball calotte 11 for the reception of the joint head. In addition, the internal wall 14d of the piston 10, through which the oil channel 13 extends, has an extremely high material hardness, contributing to a higher strength of the piston 10. In the case of the hollow piston, the latter property allows an enlargement of the hollow space(s), which contributes to a further weight reduction.

The finer hatches in the enlarged view indicates the forming region 12 of the piston 10, which has a high ductility in the piston 10 according to the application, which enables a process-secure cold-forming. The requirement of a certain ductility and the advantages of a high ductility have already been discussed in the introductory part of this application. The first contact zone with the tool for cold-forming is indicated with reference character 18. Thus, high ductility is present along the surface sections indicated with reference character 12b, i.e. these sections have the same relatively low material hardness as is present in the inside of the core material. The same applies to the edge region 12c on the inside of the piston 10.

On the one hand, the joining region of the piston, where the cold-forming directly occurs, is to have a (relatively) low hardness. On the other hand, a contact surface to the ball head exists after the insertion of the sliding block into the edge region 14b marked here, which is why a hardened layer is provided in the region 14b.

The edge layer 12a in the forming region 12 of the piston that is located in direct proximity to the recess is illustrated in the enlarged view to be separated from the remaining larger forming region 12 bearing the fine hatches. The latter edge layer 12a has a medium ductility compared to the already mentioned extremely high and relatively low material hardness, which corresponds to that of the core material. However, this ductility is defined in a very precise manner and represents the best-possible compromise of the mentioned opposed component requirements. As already mentioned, a sufficient plastic formability is to be present, so that the forming region 12 will not be damaged on the piston 10 when inserting the joint head. On the other hand, a sufficient material hardness is provided, so that the creation of a smooth surface is possible and a high durability against the forces acting in operation is provided.

In the enlarged view, two sections of the piston wall are located outside the hatched regions. The section 16 along the external wall of the piston 10 between the forming region 12 and the strongly-hardened region 14a can suitably be referred to as a reserve zone 16. This zone has the hardness of the core material or a slightly higher material hardness, so that a sufficient strength of the piston 10 exists there in any case and, on the other hand, an unnecessary high brittleness is prevented, in order to prevent a pre-damaging of the piston 10 when inserting the ball head. It is possible for the forming region 12 to extend beyond the region marked with the finer hatches here.

The piston wall has an annular internal groove 17 and has a low material hardness in the near region of said annular groove 17. The purpose of this design lies with the prevention that the forces to be introduced by the tools when inserting the joint head are introduced into the wall region that is already adjusted in shape to the ball head and could even cause a forming in this region. The latter would logically lead to a potential jamming of the ball head connection. However, merely the introduction of forces into this hardened and thus brittle region could cause small amounts of material or material fractions to break-out.

In contrast to the pistons corresponding to the conventional art, where the material hardness present across the entire piston surface or at least present across parts of the surface areas are a compromise between high durability and sufficient ductility, a piston 10 according to the application comprises closely neighboring surface regions with strongly different material hardness in certain regions which might be advantageous. The compromise is restricted to a very small subregion of the piston surface, namely the protruding collar of the recess for receiving the ball head, wherein the production according to the application allows an exact specification of the material hardness there. Through the application of the fabrication steps according to the application explained in the following, the material hardness of the piston 10 can be adjusted to the requirements for its entire surface and, as can be taken from the following, for its entire material layer close to the surface, in an optimal manner.

As an alternative to the configuration as a solid piston according to FIG. 2, the piston wall may comprise one or multiple cavities, and this in turn with or without fillers. Moreover, a piston 10 according to the application does not necessarily have to be produced from solid material, but could instead be constructed based upon one or multiple tube-shaped basic elements.

B) Fabrication, According to the Application, of Pistons 10

Figure 3:
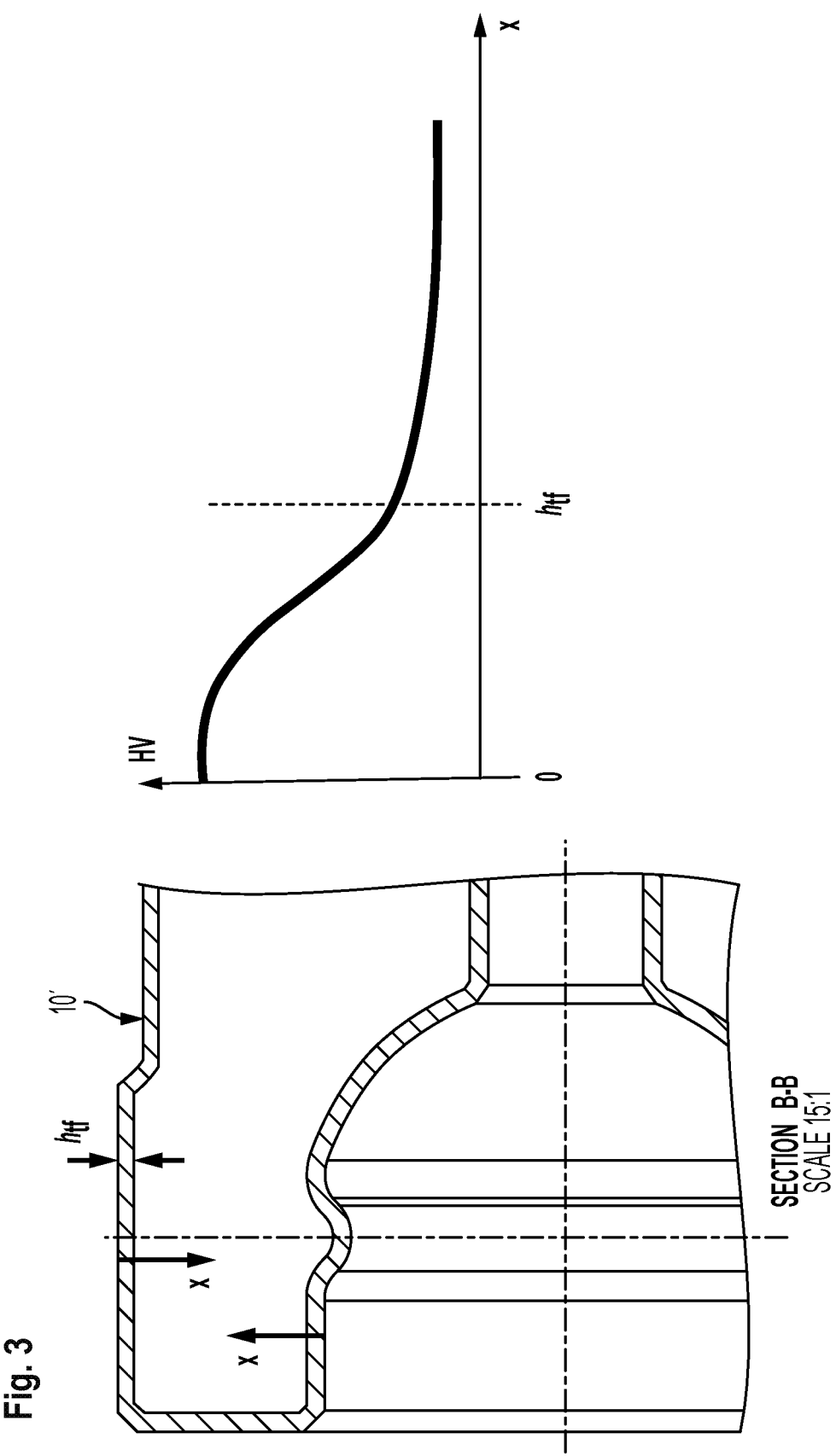
FIG. 3 shows a representation of the required piston blank shape for the final forming of the piston of FIG. 2.
Figure 4:
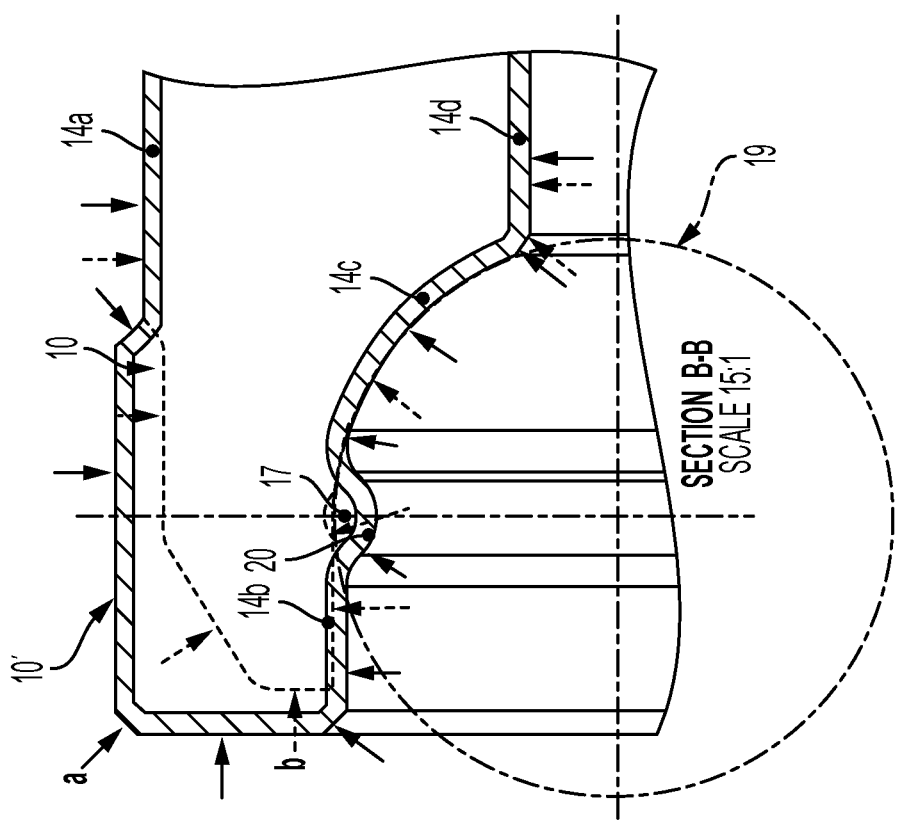
FIG. 4 shows a comparison of the completed piston according to FIG. 2 with its blank shape of FIG. 3.

The left part of FIG. 3 shows an enlargement of the blank piston 10' according to the application, which corresponds to the subregion of the enlarged view of a piston 10 according to the application shown in FIG. 2 after its completion. The shape of the blank piston 10' serves as a preparing measure for the heat treatment serving for the material hardening. According to the convention of the hatches introduced by FIG. 2, the blank piston 10' of FIG. 3 has a continuously hardened surface. The blank piston 10' has oversize in the certain regions with respect to the completed piston 10, which is clarified by FIG. 4, in which the enlarged views of the blank piston 10' and of the completed piston 10 are superimposed. In this case, the enlarged view illustrating the completed piston 10 is shown with dashed lines. For a better understanding, a full circle 19 is shown in the ways and manners which represents a ball head positioned in its installation position. Arrows b with dashed lines indicate the exposed surface after the machining carried out after the hardening process. At the same time, this surface corresponds to the surface of the completed engine piston 10. The arrows a with solid line indicate the exposed surface hardened by heat treatment on the illustrated partial section of the piston blank 10'.

As can be seen from the contours representing the surfaces, the surface of those wall regions that have a high material hardness in the completed piston 10, which concerns (i) section 14a of the external wall of the piston, which is in contact with the engine bore or the bushing present therein, and (ii) wall section 14c, which already has the ball calotte adapted in shape for the reception of the ball head, as well as (iii) the wall 14d of the central bore, are identical in both superimposed enlarged views.

By contrast, relatively large oversize of the blank piston 10' is present in those wall regions where the material located at the surface is also ductile in the completed piston 10; this relates to the forming region 12, the reserve zone 16 and the annular groove 17. As can be discerned in FIG. 2, in the completed piston 10 according to the application, the internal side 14b of the protruding collar has a hardened layer, which is significantly thinner than that of the wall region 14c at the surface of which the exactly shaped ball calotte for the reception of the joint head already exists.

For the purpose of a simplification of the drawing, discrimination between hardened and non-hardened zones in made by a corresponding hatching in the Figures. As is known, these is not an abrupt transition from a soft to a hard material in a heat treatment. Instead, a locally and temporally continuous hardening process exists by the heat treatment. Based upon a hardened material surface, first a progressive decrease of the material hardness HV is present as the penetration depth x increases, and, from a certain penetration depth x on, practically a degressive decrease is present, so that the ductility of the non-hardened material is present as from a certain penetration depth (see diagram on the right in FIG. 3).

From this conjunction, it becomes clear that a layer thickness of material determined for achieving the specified final shape of the piston by the intentional selection of the oversize at the internal side 14b of the protruding collar after the defined heat treatment is removed, and that thus the material hardness of this surface is predetermined. In accordance with the material hardness to be achieved there, and the surface hardness of the blank piston 10' achieved after the heat treatment, this oversize is set.

Figure 5:
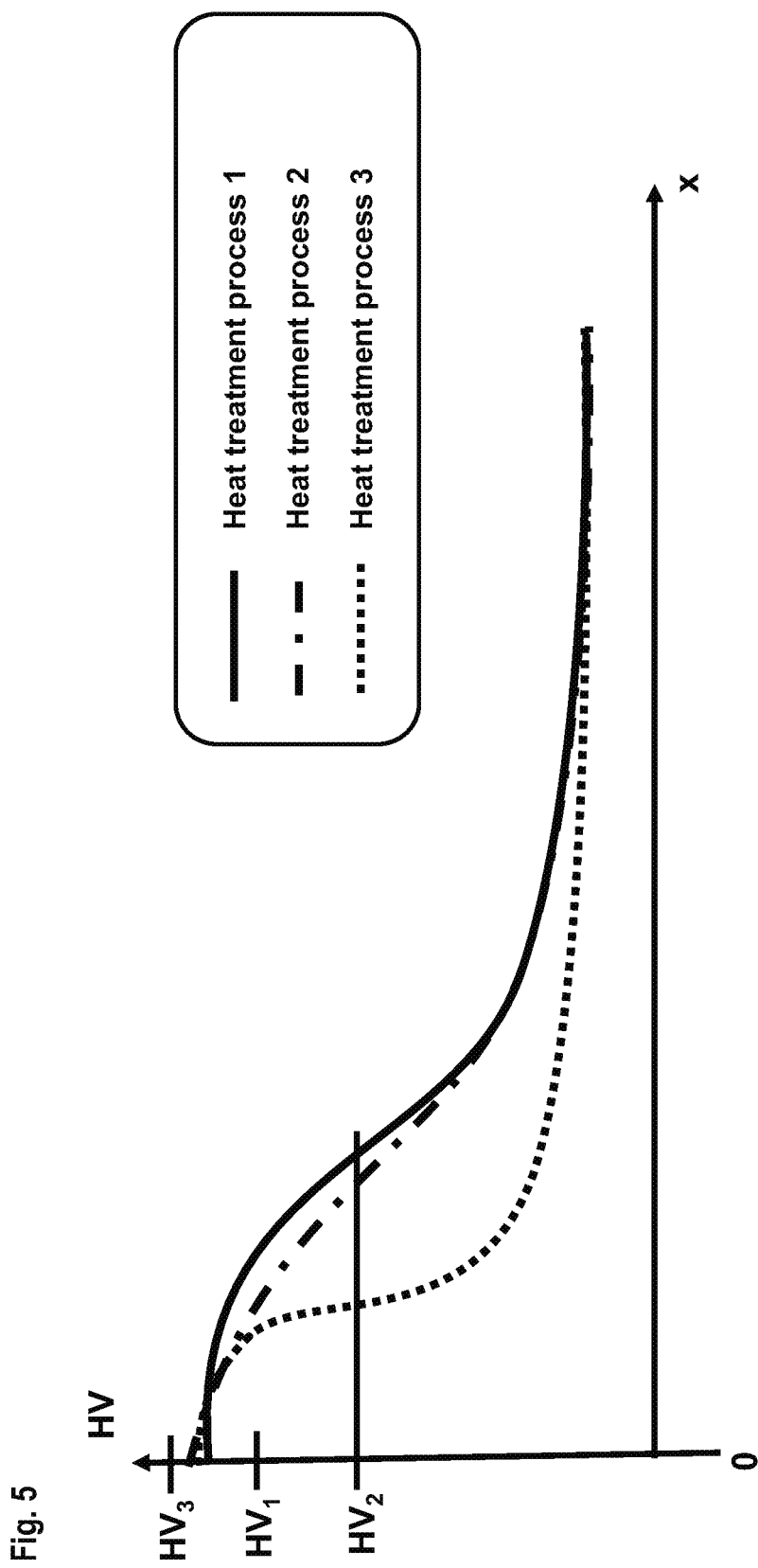
FIG. 5 shows a diagram of the correlation between hardening depth and material hardness for different hardening processes.

In a further developed configuration of the production method according to the application, the intentional application of defined oversize in the shape of the piston 10' is considered in conjunction with the degrees of freedom present in the heat treatment. The diagram of FIG. 5 serves for explanation, where the respective material depth x is plotted against the present hardness degree HV. The achieving of a high material hardness merely requires a correspondingly intensive heat treatment. Let the minimum value for ensuring a sufficiently high material hardness be HV1. In order that the material removal at the blank piston required for finishing the piston 10 is possible with reasonable efforts, a hardness value HV3 might be set a threshold. A material hardness of the value HV2 be provided at the completed piston 10 for the protruding collar of the recess for receiving the ball head. Different courses of the material hardness can be set through the selection of the method of the heat treatment (e.g. nitration, gas nitration, gas nitro carbonation, plasma nitration, etc.) as well as the process design with regard to the temperature profile and the duration of the process application etc. with respect to the penetration depth x (FIG. 3, illustration on the left). FIG. 5 shows three different courses of the material hardness HV depending on the penetration depth by way of example. Thus, by the exact specification of the heat treatment processes and of the oversize, the surface hardness and the hardness on the layers of the protruding collar close to the surface can be adjusted in an optimal manner.

The targeted use of oversize at the blank piston 10' is not restricted only to regions where the hardened layer is to be removed completely or almost completely for finishing the piston 10, but also to the transition regions between the strongly-hardened and less strong surface regions. This aspect can be well be explained for the fabrication of the annular groove 17 (see FIG. 4). In the region where this groove has its strongest depression, the blank piston 10' has the largest oversize in the recess for the reception of the ball head. The oversize applied on the surface of the annular groove at the blank piston for the specification of the material hardness is formed like a bulge and indicated with reference character 20. In the region of the center of the annular groove, a intense forming takes place in the subsequent insertion of the ball head. Thus, low material hardness is also present in the region of the annular groove 17, as are present in the interior of the core material.

Figure 6:
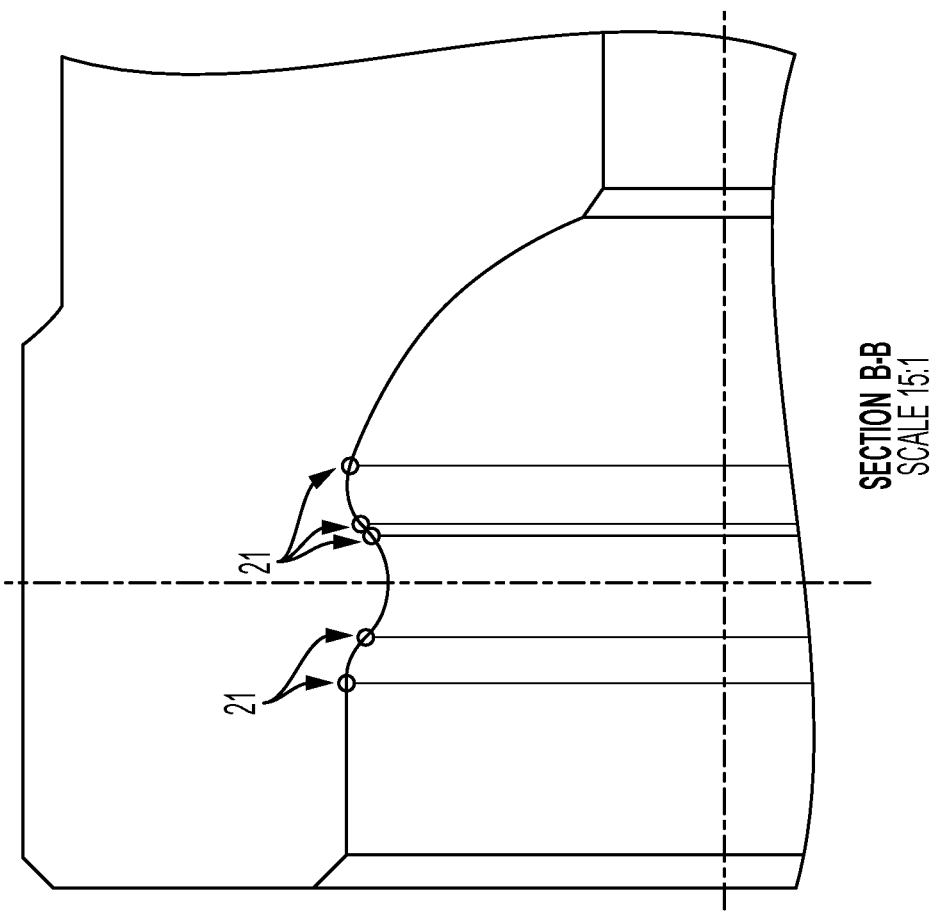
FIG. 6 shows a detailed representation of the piston blank shape according to FIG. 3 with marked transition points.

In order that the occurrence of notch effects, which causes a significant reduction of the component strength, is prevented, these so-called transition areas at the piston are rounded-off. A design of these transition areas results from a constant tangent-continuous (edge free) course of the contours of the blank piston 10', as is illustrated in FIG. 6 by the circles 21, and of the completed piston 10 (see FIG. 2), which correspond to the course of the diameter of the recess with respect to the direction of the bore.

The fabrication of the piston according to the application with the production steps according to the application and their advantages takes place in a chronological order:

Fabrication of the blank piston 10' with the intentionally selected, exactly-defined oversize made of a material with a relatively high ductility, which is well suited for hardening and, after the hardening thereof, smooth surfaces can be achieved by corresponding postprocessing.

Intensive hardening of the blank piston 10' potentially by a heat treatment. Here, the selection of the process of the heat treatment (e.g. nitration, gas nitration, gas nitro carbonation, plasma nitration, etc.) as well as the process design can be adapted to the temperature profile and the duration of the process application etc., so that the surface hardness is in a suitable range (strength versus efforts for the required material removal) and a comprise for the sensitive region of the piston is achieved. Likewise, an optimization under the trade-off between surface quality and production efforts is possible.

By contrast, compromise is not reached between the two opposed component requirements in the heat treatment.

Material removal for the final forming of the piston 10, as required for the insertion of the ball head. By this material removal, it is achieved at the same time that the surface of the piston has the desired local material hardness.

After the fabrication of the piston 10, the ball head is inserted. This process is potentially performed by a cold-forming (e.g. rolling, rolling-in, etc.), wherein the insertion can be supported by a moderate heating.

Figure 7:
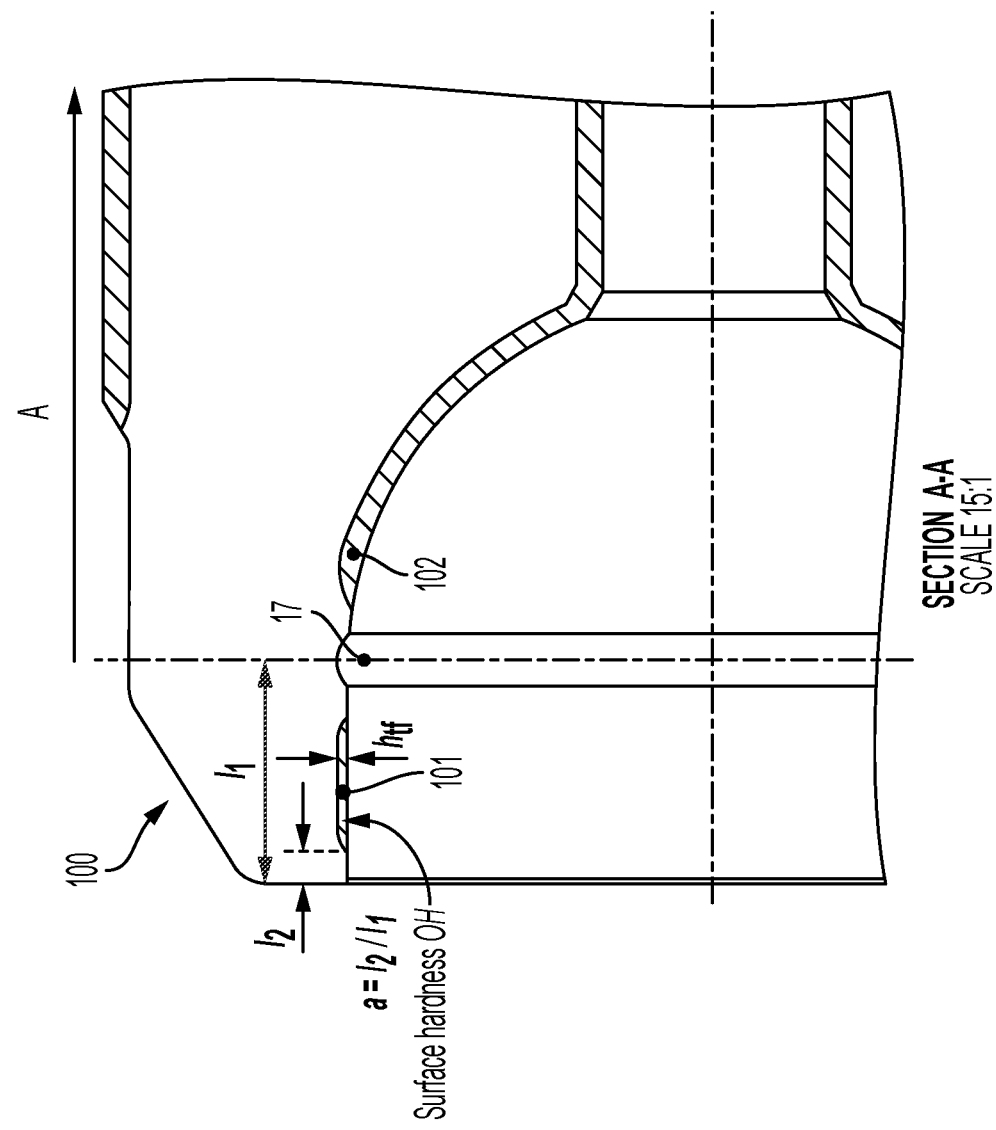
FIG. 7 shows a representation of the piston according to the application according to a second embodiment.

In the joining process of the piston 10 for the installation of the ball head, respectively the sliding block, the maximum deformation exists at the outer end of the protruding collar of the piston. This problem can be addressed by an modification of the piston 10. This variant is shown in FIG. 7. The differences to the piston according to the application shown in FIG. 2 are discernable by the enlarged view shown there. The entire region A is identically constructed to the variant illustrated in FIG. 2. Thus, reference is made to the above explanations on the exemplary embodiment of FIG. 6 in terms of geometry and properties. However, in the piston variant 100, the internal surface of the protruding collar does not consist of hardened or significantly less hardened material as the wall section 102 following to the right side in the drawing. However, in the completed engine piston 100, the hardened zone 101 with a hardening depth htf does not reach all the way to the end of the piston 100 facing the sliding block. Despite this measure, a hardened support surface still exists. The structure is present in a non-brittle state in the entire near region where the tool acts for cold-forming, as is the case after a hardening process.

Regardless of the size of the ball head connection, respectively of the ball head diameter, an optimization of the known opposed component requirements can be achieved by an adaption of the size relation a=l2/l1, as can be taken from FIG. 7, with l2 indicating the section between the end of the piston 100 facing the sliding block and the start of region 101, and l1 indicating the section from the end of the piston 100 facing the sliding block to the central axis of the annular groove 17. With respect to engine pistons for axial piston machines, good piston properties are achieved when the zone 101 is fabricated with the parameters for the hardening depth htf, the achieved surface hardness OF of zone 101 as well as the above mentioned longitudinal portion a shown in the following table. The individual rows "preferential area", "extended area" and "extremely extended area" indicate the parameters for the different dimensioning examples here.

| Input sizes see FIG. 15 | Hardening depth htf | Surface hardness OH | Longitudinal portion a |
| --- | --- | --- | --- |
| Preferential area | 0.02 mm to 0.25 mm | 300 HV bis 500 HV | 0% to 30% |
| Extended area | 0.02 mm to 0.25 mm | 300 HV bis 600 HV | 0% to 35% |
| Extremely extended area | 0.02 mm to 0.7 mm | 300 HV bis 1000 HV | 0% to 40% |

Figure 8:
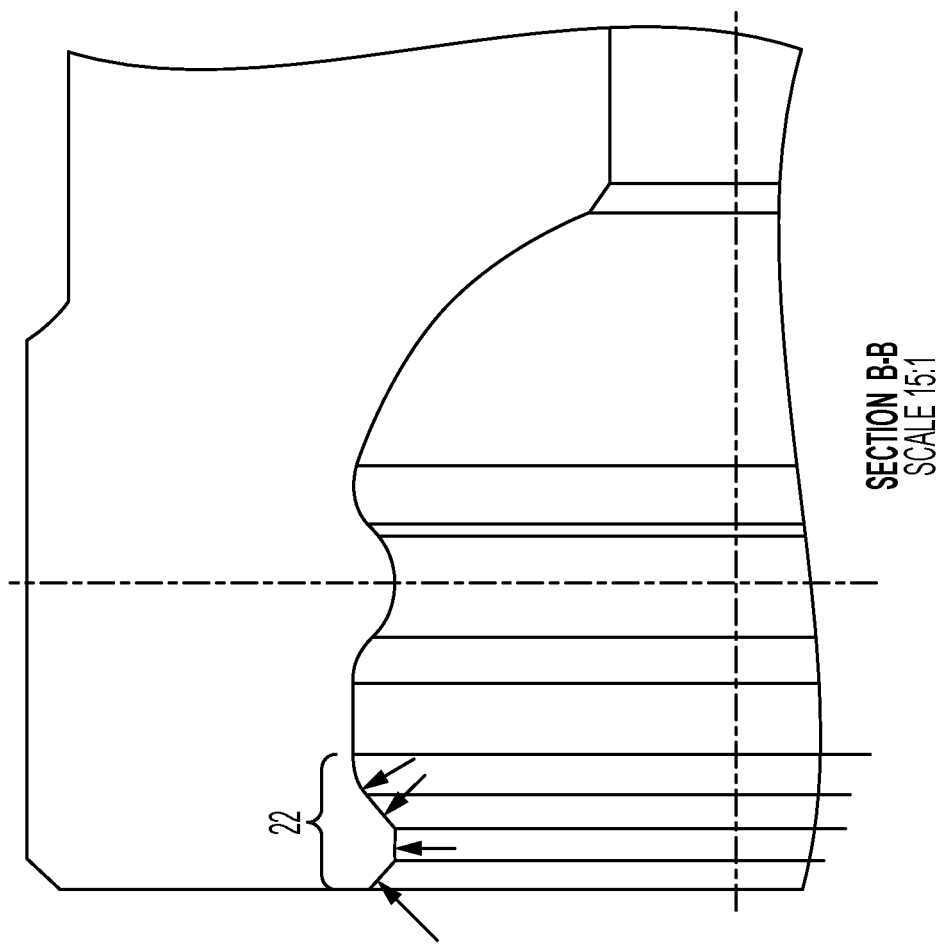
FIG. 8 shows a representation of the required piston blank shape for the final fabrication of the piston according to FIG. 7.
Figure 10:
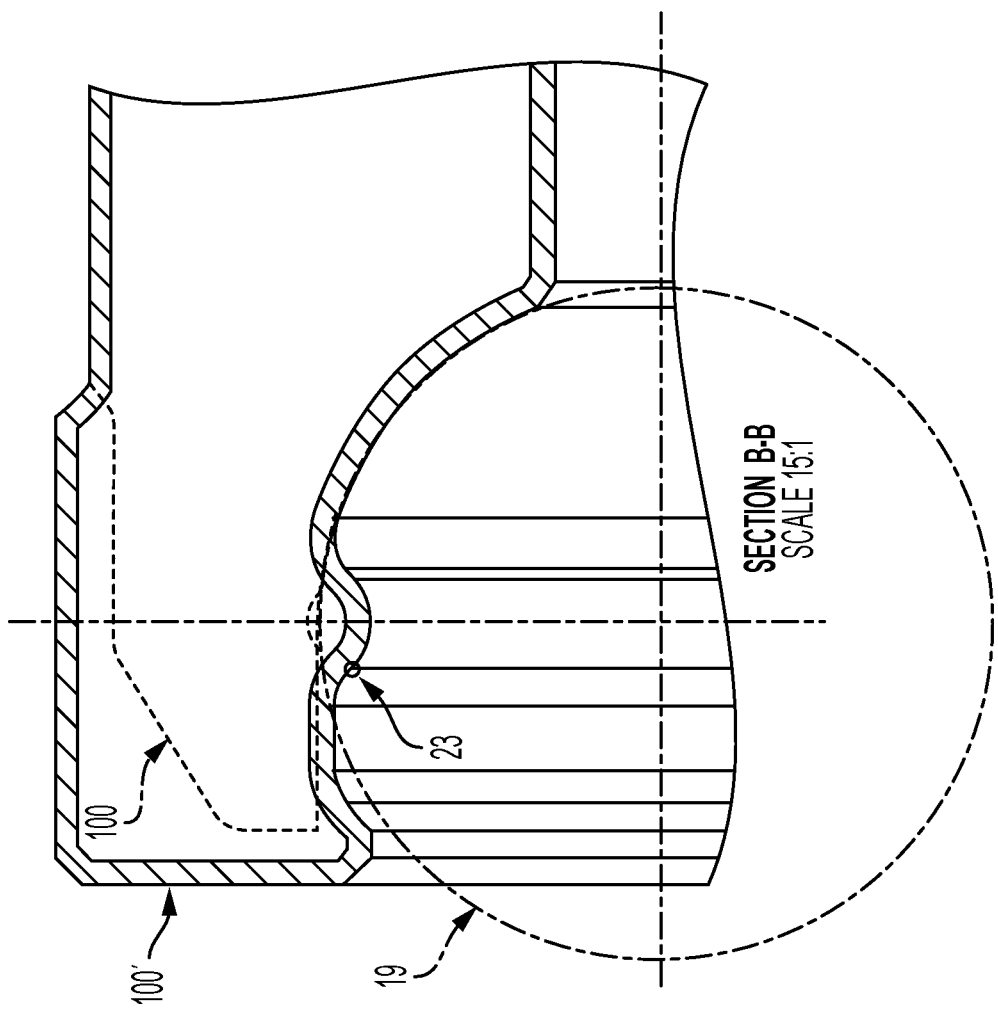
FIG. 10 shows a comparison of the completed piston according to FIG. 7 with its blank shape of FIG. 8.

With reference to the already used enlarged regions, the fabrication of a blank piston 100' according to FIG. 8 takes place before the embodiment of the completed piston 100 shown in FIG. 7 in the production according to the application. In the representation of FIG. 10, the blank piston 100' and the completed piston 100 are superimposed again in order to point out the corresponding oversize region. In accordance with the above explanations of the production method according to the application, this blank piston 100' comprises the marked section 22 of additional oversize.

By a corresponding shape of the blank piston 100', as a further variant using the production method according to the application, pistons can be fabricated in which the material hardness has different material hardnesses on the internal surface of the protruding collar with respect to the depth direction of the recess. Potentially, the smallest material hardness would be present at the end of the collar, and an increase of the material hardness would occur with respect to the depth direction of the recess, till a longitudinal portion with a constant material hardness is present. Alternatively, this increase of the material hardness could continue to the vicinity of the annular internal groove.

Figure 9:
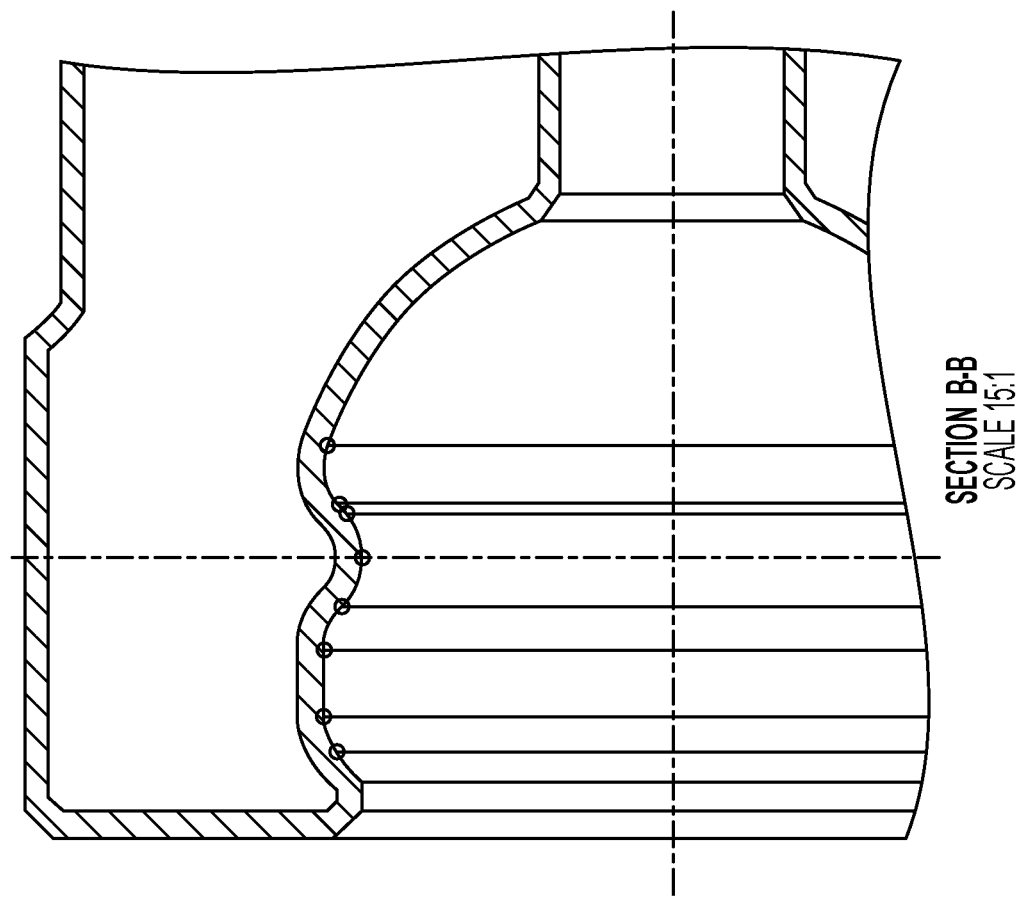
FIG. 9 shows a detailed representation of the piston blank shape according to FIG. 8 with marked transition points.

Similarly, edge-free courses of the contours of the blank piston 100' and of the completed piston 100, which correspond to the course of the diameter of the recess with respect to depth direction. The corresponding tangent-continuous transitions in the blank shape contour selected in accordance with FIG. 8 are again shown by circles in FIG. 9. The meaning of these roundness in the contour of the oversize is to be explained by way of example based upon the roundness in FIG. 10, which is marked with the small circle. Although this roundness 23 as well as the entire oversize contour will no longer exist as a surface of the piston 100 after finalization of the piston 100, it is exactly this oversize contour present in the hardening process according to FIG. 10 that has or will influence the hardness distribution within the completed piston 100.

Each non-tangent-continuous change in contour along the oversize contour causes an abrupt change in hardness within the completed piston 100. An abrupt change in hardness within a component presents a local weakening of the material microstructure there. Weakness of the material microstructure in regions where the plastic deformation is to occur present an increased risk of component damaging during the cold-forming process.

Further advantages for the insertion of the ball head, and thus for the piston-sliding block unit can be achieved by the selection of the oversize of the blank piston 10', 100'. Different forming methods can be used when establishing the ball joint connection. Through cold-forming, thermal stress will not act upon the hardened and polished surface, which could cause a damaging of the same; at least when a too strong heating is present over a long period of time. The insertion of the ball head into a piston 10, 100 according to the application does not necessarily have to take place by a cold-forming, but a piston 10, 100 according to the application is much more suitable for it. Besides the process temperature, further degrees of freedom are available for the forming, i.e. the selection of the method (e.g. rolling-in, rolling, bending) and the geometry of the deforming tool, respectively of the contact zone of the tool at the protruding collar of the piston 10, 100.

As explained above, the production according to the application of the piston 10, 100 achieves a better suitability of the protruding collar. This, in turn, creates a larger scope of using such a forming method and such a tool, by means of which possibly a ball joint connection that has a better quality or lower production efforts can be achieved. In this context, a ball joint connection with a higher quality means that it has a higher durability, or that a configuration of such a piston sliding block unit can be fabricated that provides other advantages for the conditions of use present in such an axial piston machine.

A very distinctive example lies with the enclosure width of the piston head. In this case, there is an opposite of two requirements in piston/sliding block units. On the one hand, a higher enclosure width is advantageous for stability and precise guiding of the ball head in the ball calotte. However, on the other hand, the maximum possible inclined angle of an axial piston machine is decreased by a higher enclosure width.

Figure 11:
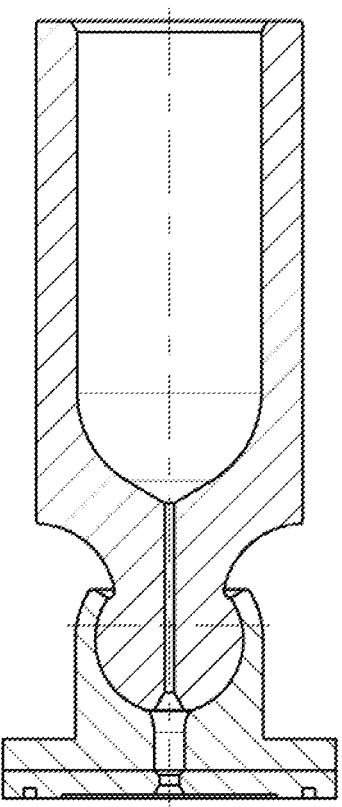
FIG. 11 shows an alternative arrangement of the ball joint connection for a sliding block piston unit.

The current text describes pistons, which are connected to the ball head receptacle by material engagement, and the sliding is connected to the ball head correspondingly by material engagement. The above description on the piston/ sliding block unit and on the manufacturing process according to the application can be translated into the shown piston/sliding block unit according to FIG. 11 without limitations, in which the piston bears the ball head and the sliding block is configured with the corresponding ball head receptacle.

As another exemplary embodiment, the method for producing a drive shaft according to the application is to be explained. The drive shaft 80 shown in FIG. 13A exhibits multiple concave sections along its axis direction. With respect to the bending of the drive shaft in operation, and occurring torsional moments, the concave sections present weaknesses of the drive shaft. Instead of a simple global hardening of the entire drive shaft, as has been done in the entire conventional art, a hardness profile of the drive shaft suitable designed in its longitudinal direction is implemented by means of the method according to the application, whereby a higher stress resistance and durability of the shaft can be achieved.

Figure 13:
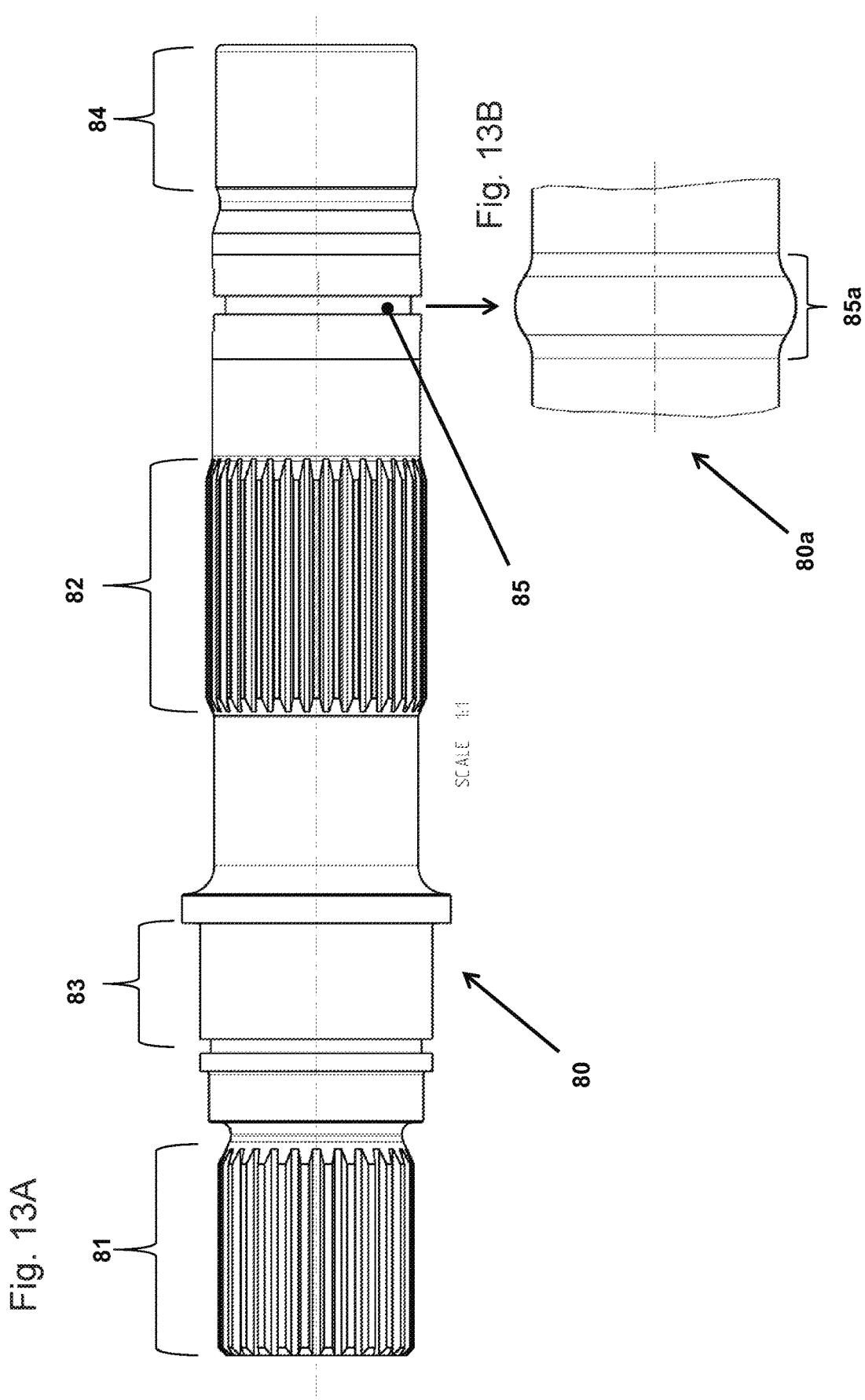
FIG. 13A shows a first version of a drive shaft produced in accordance with the method according to the application.
FIG. 13B shows a detailed representation of the shaft blank for the drive shaft of FIG. 13A.

FIG. 13A shows the desired final shape of the drive shaft 80 according to the application. The shaft 80 includes an external toothing 81 for the transmission of torque from the axial piston machine to a coupled device, as well as an inner toothing 82 for a co-rotational mounting of the engine drum 1 of an axial piston machine on the drive shaft 80. The section 83 serves as a bearing support surface of the drive shaft within the axial piston machine. A further support surface for a bearing is formed by the surface section 84. A focus lies with the recess 85, which is formed by a step-like sectional tapering, and typically serves to accommodate a shaft securing ring.

The recess 85 is a concave region of the drive shaft 80, which often has abrupt changes of the hardness degree in conventionally fabricated drive shafts, and thus tends to have the disadvantageous notch effect.

To prevent this problematics, the production method according to the application is used. Here, the drive shaft 80 is manufactured as a blank part 80a first. The blank part 80a already mainly has the final drive shaft shape of FIG. 13A, the region around the recess 85 is first fabricated with an intentional material oversize 85a, as is indicated in the detailed image of the blank part 80a in the region of the recess 85 (FIG. 13B). Such as, the region of the recess 85 to be fabricated is fabricated with a convex bulge 85a. The bulge 85a, which entirely runs around the circumference of the shaft, has a diameter maximum, which is located centrally above the desired recess 85. In addition, the diameter of the bulge decreases in the axial direction.

The blank part 80a is then subjected to a global hardening, e.g. by nitration, gas nitration, gas nitro carbonation, and plasma nitration, where the entire component 85a is exposed to the hardening process, which finally leads to a constant material hardness of the drive shaft in the axial direction under ideal conditions.

FIG. 14 once again schematically shows the recess 85 of the drive shaft 80. The solid line A indicates the surface contour of the hardened drive shaft blank 80a, whereas the broken line B indicates the desired final shape of the drive shaft 80 in the region of the recess 85. It is discernable that the two lines A, B are not consistent in the region of the recess due to the fabrication with oversize, whereas they are consistent in the remaining shaft region, such as as from the positions indicated with X, Y.

The dotted line C indicates the end of the heat influence zone in the material interior of the drive shaft. In the hardening of the material, the workpiece is heated first, and then quenched. Line C thus indicates the depth effect of the hardening process, wherein the resulting material hardness decreases from the surface to the inside. As from line C in the direction of the central axis of the drive shaft, the material hardness does not differ from the original material hardness.

Figure 14:
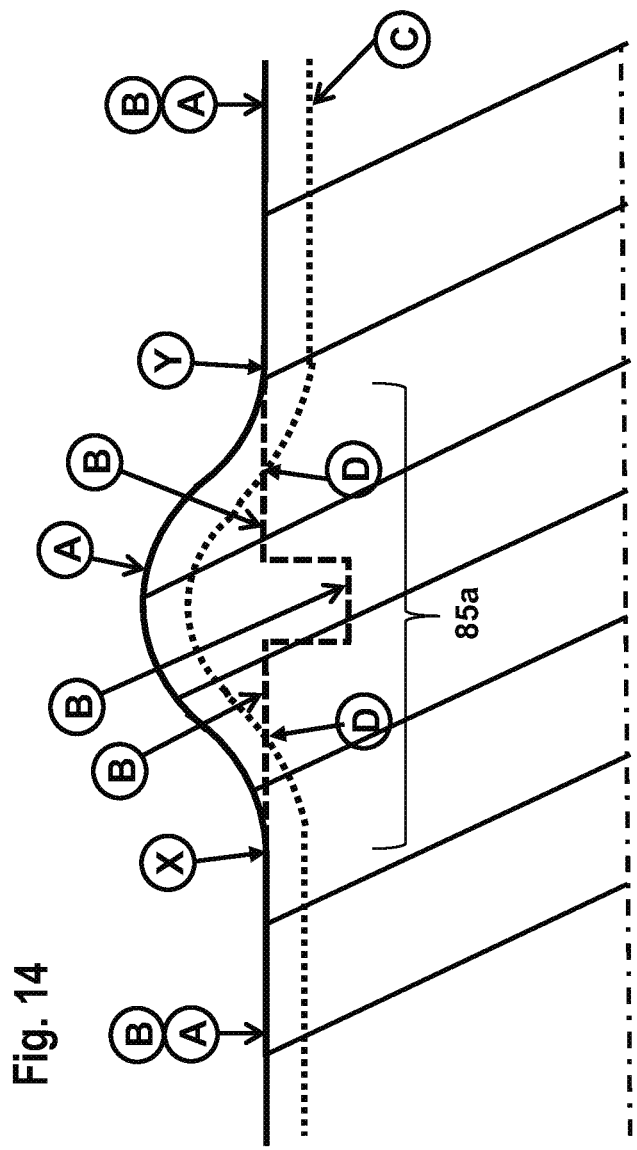
FIG. 14 shows a schematic sectional illustration of the blank of FIG. 13B.

If now, after the effected hardening, the oversize 85a is removed in the region of the recess 85, e.g. by a metal cutting or machining process, logically the material hardness achieved after the hardening step is reduced in this region. For example, the material hardness from the left or right shaft end to the points X, Y corresponds to the maximum material hardness achieved by the hardening process. The material hardness continuously and steadily decreases from the points X, Y due to the material removal, until the original material hardness of the non-hardened blank 80a is present in points D. A tangent-continuous hardness profile course is achieved in the transition area X, Y by means of this method. As a matter of precaution, it is pointed out that FIG. 14 schematically shows the relations of the hardness degree, and that the actual relations and hardness degrees may deviate from the relations shown in an exemplary manner here. FIG. 14 merely serves for illustration of the method according to the application and the effect thereof.

A modification of the method is to be explained in greater detail by means of FIGS. 15 and 16. FIG. 15A shows the drive shaft 80' according to the application, in turn, with the corresponding components 81, 82, 83, 84. Just as well, the region of the recess 85' is produced with an oversize 85a' in the production of the blank 80', wherein, however, a corresponding oversize 85a' in the transition region of the non-tapering diameter drive shaft regions to the tapering-diameter recess 85' is kept in this embodiment. This is shown in FIG. 15B. Such as, a convex bulge 85a' is provided for each boundary zone here, which steadily decreases in the axial direction away from the recess 85'.

After the production of the blank 80', this blank is subjected to a partial hardening. Partial hardening can, for example, be achieved by induction hardening, laser beam hardening, or electron beam hardening. An advantage of induction hardening lies with the independent control of hardening temperature on the material surface and the penetration depth, since two influencing parameters are available to that end. The amount of the local heat ingress, i.e. the local heating of the section of the component blank to be hardened is mainly determined by the resistivity of the component material and the intensity of the eddy currents caused. The latter results from the intensity of change of the magnetic field generated by the inductor. The intensity of change increases both as the amplitude of the magnetic field increases and as the frequency of the magnetic field increases. The frequency of the magnetic field is, at the same time, the frequency of the eddy current. Commonly known and referred to as skin effect, the penetration depth of the electric current or the eddy current in the conductor or of the component to be hardened is reduced as the frequency increases.

Although the hardening process can be restricted by partial hardening to those components where a hardening is to be effected, which in turn results in energy savings and reduces the hardening duration, but the pure partial hardening of highly-stressed components has a disadvantage compared to the here applied combination according to the application of partial hardening and oversize fabrication. The method according to the application allows achieving a continuous transition from the strongly hardened to the unhardened component surface regions. This prevents the weaknesses caused by the notch effect, which result in the case of direct transitions from strongly-hardened to unhardened component regions.

The indicated detailed illustration of the blank 80a' in FIG. 16 indicates the region that has been subjected to a partial hardening. It can be seen here that the hardening is restricted here to a region neighboring the recess 85, and merely reaches to the maximum of the corresponding bulge-like oversize 85a'. FIG. 16 again shows the end of the heat influencing zone C of the material hardening that was carried out.

Now, by a corresponding removal of the bulge-like oversize 85a', a tangent-continuous transition of the hardened surface region into the non-hardened surface region of the recess 85' can now be achieved. FIG. 17 shows the schematic subregion of the final-formed drive shaft 80' in the region of the recess 85'. Such as, arcuate surface contours 86a', 86b' remain laterally next to the recess 85' after the removal, wherein the outer arcuate contours 86a' exhibit the maximum degree of hardness, while the internal arcuate contours 86b' merely have the original material hardness. Starting from the respective bow 86a', the material hardness continuously and tangent-steadily decreased, until reaching the original material hardness in point 87', which is located roughly midway between the bows 86a', 86b'.

The described advantageous effect of the application can be explained in an illustrative manner by means of the comparison between FIGS. 17 and 18, which shows a corresponding schematic of a conventional drive shaft 8, which has merely partially been hardened. It is discernable here that the drive shaft 8 has an abrupt change of the material hardness in FIG. 18 in the place 8a, where also the end of the partial hardening zone is located, whereas the drive shaft 80' according to the application instead has a continuous transition of the material hardness by a continuous change thereof, which is shown by the slow approximation of the characteristic curve C to the material surface without abrupt change.

Besides using the method according to the application for the processing of a concave section during the fabrication of a shaft, the method is likewise suitable to create one or multiple defined longitudinal sections of the drive shaft with optimized hardness profile. Such an optimized hardness profile of the shaft in the axial direction can be suitable to handle occurring stress, such as working stress such as internal stress, in a better manner. In the drive shaft, there is a local high stress in the region between toothing, e.g. the toothing 81, 82. Through the contacting of the drum 3 in the region of the toothing 82, transversal forces are introduced into the drive shaft 80, which result from the supporting of the piston 1 in the swashed plate 4. There is also a high stress of the material by the resulting torsional moment on to the drive shaft 80, which predominantly takes effect on the section between the shaft input, i.e. the toothing 81 of the drive shaft 80 outside the housing, and the shaft toothing 82.

An embodiment of this application is to provide this section of the drive shaft with a longitudinal section, which is characterized by an optimized material hardness profile, wherein such an optimized profile can be achieved by means of the method according to the application. Such as, any notch stress is to be completely avoided by means of the optimized hardness profile. Instead of a fully-hardened drive shaft, the material hardness of which has the value of HV0 across the entire surface, a higher durability and stress resistance of the drive shaft will be achieved if two longitudinal sections in the axial direction are provided immediately next to the toothing 82, which have an advantageous hardness profile with the material hardness of $HV(x) \leq \max HV(x)$, with x indicating the position in the axial direction. Outside of these longitudinal sections, the surface of the drive shaft has a material hardness of $\max HV(x)$.

FIG. 19A shows the desired final shape of a drive shaft 80", which has been fabricated in accordance with the above form of the method according to the application. Marked here are the above-mentioned longitudinal regions 88" with the optimized hardness profile. To that end, a blank 80a" of the drive shaft 80" is produced, which in the marked regions 88" has been produced with a corresponding oversize 88a", shown in FIG. 19B.

This blank 80" is now subjected to a global hardening. FIG. 20 schematically shows the relevant subsection of the hardened blank 80a". The end of the heat influence zone in the material interior is again marked with C. The drawing shows the longitudinal region 88" located to the left of the toothing 82, which has been produced with a corresponding oversize 88a".

Specifically, the oversize region 88a" can be subdivided into a convex arcuate section a and a concave arcuate section b. FIG. 21 then shows the final-formed drive shaft 80" after the occurred material removal. The solid line along the drive shaft surface marks the surface sections of the shaft 80", in which material was not removed in the final production. The dashed line B shows the new surface generated by material removal, the hardness degree of which deviates from the remaining shaft surface. Such as, the material hardness decreases in the direction of point D, which is the point of the minimal material hardness (original material hardness), coming from both sides. The decrease is tangent-continuous without abrupt changes of the hardness degree, coming from both sides. By the respective local, individually intentionally selected oversize 88a" in the fabrication of the shaft blank 80a", the respective local material hardness and hardness depth is achieved in the finished drive shaft 80". Specifically, the input segments and output segments a, b are rounded in such a way that an ideally tangent-continuous contour results, so that no notch effect can be caused by an abrupt transition of the hardness profile in the finished drive shaft 80". The contour of the material hardness is selected in such a way that the course of stress caused by the drive shaft 80" stressed in operation can not lead to locally critical stress of the drive shaft 80", i.e. the superimposed course of stress of working stress and internal stress (fabrication including hardness) is, after all, controlled by the oversize 88a" of the shaft blank 80a" in such a way that the stresses will not superimpose in a disadvantageous manner in operation.

Figure 23:
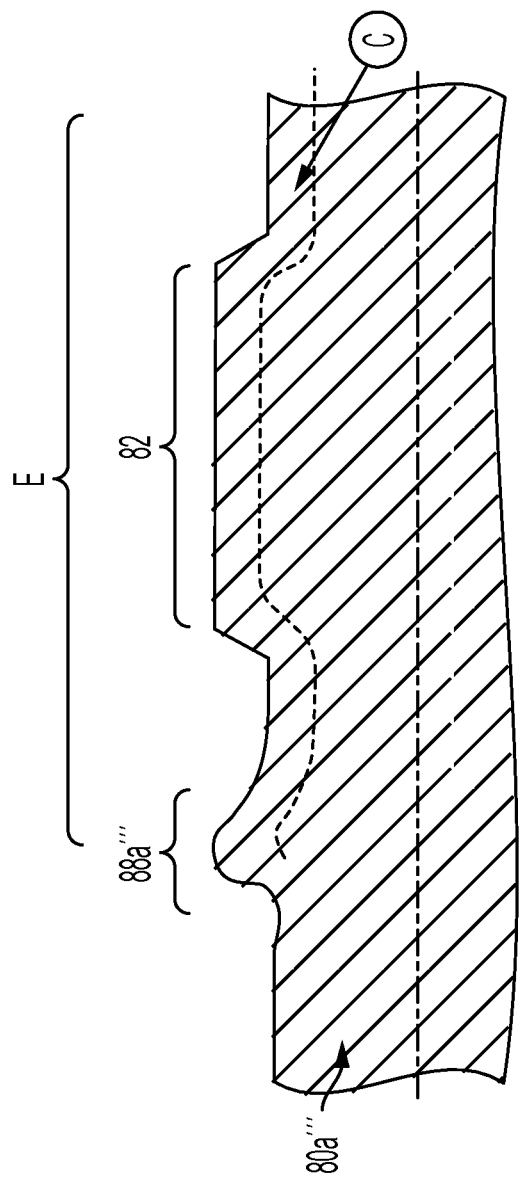
FIG. 23 shows a schematic sectional illustration of the blank according to FIG. 22B.
Figure 24:
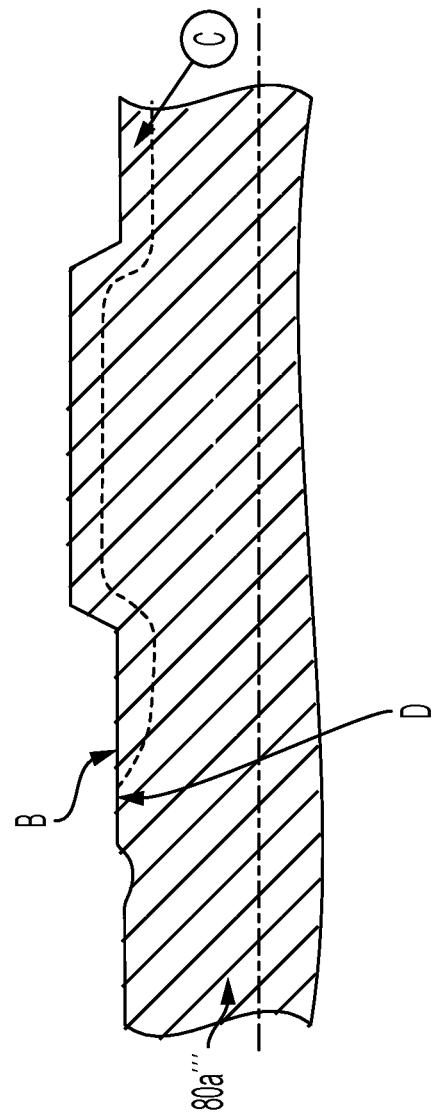
FIG. 24 shows a schematic sectional illustration of the final-formed drive shaft according to FIG. 22A.

An alternative to the above-mentioned method is to be explained yet by FIGS. 22 to 24. In this method, again a partial hardening is conducted, instead of a global hardening of the drive shaft. Just as well, FIG. 22A shows the desired final product of the drive shaft 80". As in the preceding exemplary embodiment, corresponding longitudinal regions 88" are to be generated to the left and right of the toothing 82, which differ from the remaining drive shaft sections by a lower hardness profile for the optimized handling of working stress occurring within the drive shaft 80".

However, in this case, the shaft blank 80a''' is produced in these longitudinal regions 88' with a slightly deviating oversize 88a", which exhibits an increasing diameter from each side of the toothing 82 in the axial direction of the respective shaft end. This prepared shaft blank 80' is subsequently subjected to a partial shaft hardening. The axial extent of the partial hardening is indicated with the bracket E in FIG. 23. Thus, the partial hardening extends across the toothing region 82 as well as the respective oversize 88a''', wherein the left longitudinal region 88" is shown in FIG. 23. After finalizing the partial hardening, a layer that represents the transition from unhardened to slightly hardened material in the interior of the material, and just as well, the end of the heat influence zone of the material hardening is marked in the interior of the shaft blank with the dashed line C. This layer is located at the depth, i.e. at the distance to the surface of the shaft blank, where the temperature course only just causes a hardening in the partial hardening of the shaft blank.

In the sectional view of the drive shaft in FIG. 23 illustrated here, the section 88a''' of the shaft blank 80' prepared according to the application is located on the left of the toothed region 82, in which the handling of stress is to be effected after the final production of the shaft 80''' during operation. If the partial hardening has been effected under certain parameters, during which partial hardening sequentially and continuously following along the longitudinal direction of the shaft blank 80a'' in the inside thereof with respect to its surface, the same power density distribution results, the end of the heat influence zone C is located in a sphere parallel to a surface of the shaft blank.

In the sectional illustration according to FIG. 24, the blank was reduced to the desired, finished-component dimension in the way of the final forming. The solid line along the engine shaft surface marks those surface portions of the drive shaft 80''' in which material has not been removed in the final production. By contrast, the dotted line B indicates the region in which a removal of material occurred during final production. The dotted line C marks the end of the heat influence zone in the material interior. It can be seen here, that in the region D of the longitudinal section 88'' where a material removal took place, the minimum degree of hardness of the drive shaft 80''' is achieved. It is also here that a hardness profile results between the toothed region 82 and the region with the minimum degree of hardness D, which, in terms of mathematics, can be referred to as a being a continuous hardness profile without abrupt changes in hardness degree. Due to the oversize 88a'' in each case selected locally and intentionally in the production of the shaft blank 80a'', the in each case optimum material hardness and hardness depth is achieved in the finished drive shaft 80'''. The contour of the material hardness is selected such that the tensile profile caused in the drive shaft 80'' applied with stress during operation cannot lead to locally-critical stress, i.e. the superimposed tensile profile of working stress and internal stress (production including hardening) is ultimately controlled, by the oversize 88a'' of the shaft blank 80a'', in such a way that the stresses do not disadvantageously add up during operation.

The above-mentioned methods for producing a drive shaft 80, 80', 80'', 80''' also allow for the advantages briefly summarized in the following.

a) If the strength of a drive shaft produced according to conventional art was too weak or tendentially too weak on the said points of weakness, a drive shaft with an increased safety margin is achieved by the method according to the application.

b) If a sufficient safety margin has already been provided by a drive shaft according to the conventional art, a corresponding drive shaft can be produced by means of the method according to the application possibly from a more cost-effective and/or a specifically more lightweight material.

c) If a sufficient safety margin has already been provided by a drive shaft according to the conventional art, the use of the method according to the application in a re-construction of the engine allows selecting a corresponding drive shaft having slightly smaller diameter, which accordingly provides for many subsequent advantages. In this way, reducing the drive shaft diameter also allows reducing the engine outer diameter. In addition, this results in an increased power density and material savings, and such as a reduction of the centrifugal forces. This, further on, leads to a reduction of friction losses, and to an increase of the efficiency, or a reduction of occurring wear.

The invention claimed is:

1. A method for producing at least one component for a hydraulic displacement unit:
   prefabricating a blank component for the at least one component, wherein at least one defined surface region of the blank component is intentionally prefabricated with oversize,
   surface hardening of the blank component,
   final forming of the at least one component form the hardened blank component by removing the excessive material at the at least one defined surface region fabricated with oversize, wherein dimensions of the oversize to be applied intentionally in the shape a blank joint part is based on the degrees of freedom existing in the subsequent surface hardening, and heat treatment to increase hardness by nitriding, gas nitriding gas nitro carbonation or plasma nitration.

2. The method according to claim 1, wherein the at least one component provides a forming region and the defined surface region is at least partially located in the area of the forming region.

3. The method according to claim 1, wherein a longitudinal portion with defined surface hardness profile in the longitudinal direction of the at least one component is produced by means of the at least one defined surface region in the final-formed component, wherein the surface profile is adapted in such a way to handle material stress occurring in the at least one component during regular operation of the displacement unit.

4. The method according to claim 3, wherein such a longitudinal portion is directly adjacent a toothing of the drive shaft.

5. The method according to claim 3, wherein the engine shaft is subjected to a global surface hardening by nitration, gas nitration, gas nitro carbonation, or plasma nitration, or a partial hardening of the one or multiple longitudinal portions including the toothing by induction hardening and/or laser beam hardening and/or electron beam hardening.

6. A method for producing a ball joint connection including a first joint part with a ball head and a second joint part with a ball head receptacle,
   wherein the first and/or second joint part is fabricated according to a method for producing at least one component for a hydraulic displacement unit comprising:
      prefabricating a blank component for the at least one component, wherein at least one defined surface region of the blank component is intentionally prefabricated with oversize,
      surface hardening of the blank component, and
      final forming of the at least one component from the hardened blank component by removing the excessive material at the at least one defined surface region fabricated with oversize,
   and after the final forming of the first and/or second joint part, the ball joint connection is connected.

7. The method according to claim 6, wherein the connection of the ball joint connection occurs through cold-forming.

8. The method according to claim 6, wherein the first and/or second joint part is made from a material with ductility.

9. The method according to claim 6, wherein the ball head receptacle of the second blank joint part, after prefabricating, has a calotte shape adjoined by a protruding collar, which when making the joint connection is deformed in such a way that it at least partially engages behind the ball head received during connection.

10. The method according to claim 9, wherein the protruding collar the surface of the collar adjoining the calotte shape and/or the surface of the collar on which a tool for the subsequent forming is placed are prefabricated with oversize.

11. The method according to claim 9, wherein the prefabricating of the blank joint part with oversize is effected in such a way that the surface of the collar engaging behind and contacting the ball head after the forming includes a subsection with a higher surface hardness in relation to the remaining section of the surface contacting the ball head after the forming.

12. The method according to claim 11, wherein the subsection does not extend as far as to the end of the collar facing the first joint part.

13. The method according to claim 6, wherein the surface of the second blank joint part forming the ball head receptacle is prefabricated with a oversize shaped as a bulge wherein material forming the bulge will be removed after the hardening process.

14. The method according to claim 13, wherein an annular groove is produced by the material removal along the bulge and exceeding the volume of the bulge.

15. The method according to claim 13, wherein the bulge-like oversize is formed with tangent-continuous transitions.

16. A method for producing at least one component for a hydraulic displacement unit:
   prefabricating a blank component for the at least one component, wherein at least one defined surface region of the blank component is intentionally prefabricated with oversize,
   surface hardening of the blank component, and
   final forming of the at least one component from the hardened blank component by removing the excessive material at the at least one defined surface region fabricated with oversize,
   wherein the at least one component is a drive shaft for a displacement unit wherein the at least defined surface region intentionally prefabricated with oversize is located in a section of the drive shaft, forms a concave or tapering-diameter section of the drive shaft in the final-formed state and/or is directly adjacent to a concave or tapering-diameter region in the final-formed state.

17. The method according to claim 16, wherein a convex material bulge is provided, as the oversize of the blank, in the defined surface region, the maximum of which is at the position at which this drive shaft has its maximum depression/tapering in the final-formed state, and subsequently the blank is globally hardened.

18. The method of claim 16, wherein at least one convex material bulge is provided in the transition to a convex/tapering-diameter section of the drive shaft and subsequently a partial hardening of the surface region of a non-convex or non-tapering-diameter section of the drive shaft to the convex material bulge is effected.

* * * * *